(12) United States Patent
Ono et al.

(10) Patent No.: US 7,258,379 B2
(45) Date of Patent: Aug. 21, 2007

(54) LAMINATED-TYPE MULTI-JOINT PORTION DRIVE MECHANISM AND MANUFACTURING METHOD THEREFOR, GRASPING HAND AND ROBOT ARM PROVIDED WITH THE SAME

(75) Inventors: Atsushi Ono, Sapporo (JP); Kazuo Yokoyama, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/199,089

(22) Filed: Aug. 9, 2005

(65) Prior Publication Data

US 2006/0028041 A1 Feb. 9, 2006

Related U.S. Application Data

(63) Continuation of application No. PCT/JP2004/009257, filed on Jun. 24, 2004.

(30) Foreign Application Priority Data

Jun. 27, 2003 (JP) .............................. 2003-183835

(51) Int. Cl.
  *B66C 1/42* (2006.01)
(52) U.S. Cl. ....................... 294/119.3; 294/86.4; 901/37
(58) Field of Classification Search ............. 294/119.3, 294/88, 86.4, 99.1; 623/64; 901/21, 22, 901/37
  See application file for complete search history.

(56) References Cited

U.S. PATENT DOCUMENTS 3,343,864 A * 9/1967 Baer ....................... 294/119.3
3,347,587 A * 10/1967 Frost ......................... 294/87.1
3,574,386 A * 4/1971 Frost ......................... 294/87.1
3,640,564 A * 2/1972 Kuster ..................... 294/119.3
3,924,519 A * 12/1975 England ......................... 92/92
3,981,528 A * 9/1976 Andorf et al. ........... 294/119.3
4,815,782 A * 3/1989 Craig et al. .............. 294/119.3
5,245,885 A * 9/1993 Robertson ................ 74/490.01

FOREIGN PATENT DOCUMENTS

| JP | 53-4965 | 1/1978 |
| JP | 8-197467 | 8/1996 |
| JP | 8-300285 | * 11/1996 |
| JP | 2000-175484 | 6/2000 |
| JP | 3226219 | 8/2001 |
| JP | 3245095 | 10/2001 |

* cited by examiner

*Primary Examiner*—Gene O. Crawford
*Assistant Examiner*—Esther O. Okezie
(74) *Attorney, Agent, or Firm*—Wenderoth, Lind & Ponack, L.L.P.

(57) ABSTRACT

A laminated-type multi-joint portion drive mechanism includes a bone member having at least two elastic deformation portions, a laminated-type pneumatic tube member having at least two line-tubes which are stacked on the bone member and which are connected to a pneumatic drive source, and a planar-type joint-portion deformation member which is stacked on the laminated-type pneumatic tube member and has pneumatic operation chambers which are placed at joint portions confronting the deformation portions, respectively, and which are connected to the tubes, wherein when pneumatic pressure is applied to one of the pneumatic operation chambers, the joint portion corresponding to the pneumatic operation chamber to which the pneumatic pressure is applied is deformable.

22 Claims, 22 Drawing Sheets

DIRECTION OF EXPANSION
AND CONTRACTION

DIRECTION OF EXPANSION
AND CONTRACTION

LAMINATED-TYPE MULTI-JOINT PORTION DRIVE MECHANISM AND MANUFACTURING METHOD THEREFOR, GRASPING HAND AND ROBOT ARM PROVIDED WITH THE SAME

This is a continuation application of International Application No. PCT/JP2004/009257, filed Jun. 24, 2004.

TECHNICAL FIELD

The present invention relates to a laminated-type multi-joint portion drive mechanism having a multi-joint portion and a manufacturing method therefor, a grasping hand and a robot arm provided with the same, as well as a robot provided with the grasping hand and the robot arm. In particular, the present invention relates to a laminated-type multi-joint portion drive mechanism and a manufacturing method therefor, as well as a grasping hand and a robot arm provided with the same, which mechanism fulfills grasping of various kinds of and diverse objects, safety for persons who use the mechanism, and flexible operation, and which mechanism is easily manufacturable with low cost.

BACKGROUND ART

Conventionally, a grasping hand with a multi-joint portion drive mechanism has been used for grasping of particular components in a limited working environment of a factory interior primarily as a hand of industrial robots, and has been under discussions and contrivance in view of higher precision, higher speed, and the like for specialized operations. In recent years, in contrast to this, there has been brisk development pertaining to robot introduction in household aid and work aid, care aid for aged or physically challenged, and the like in home, hospitals, and the like, giving rise to a desire for a grasping hand which satisfies such conditions as grasping of various and diverse objects, which could not be implemented by industrial robots, and safety to persons who use the grasping hand and which is capable of fulfilling flexible operations. For grasping of diverse objects, there has been known a robot hand described in Japanese Patent No. 3245095. This robot hand has five fingers consisting of a 4-degree-of-freedom thumb having one 4-joint-portion and four 3-degree-of-freedom fingers each having a 4-joint-portion, where miniature servomotors are contained at joint portions other than a finger-tip first joint portion, respectively, to drive the joint portions.

However, this robot hand, involving large numbers of component parts, requiring assembly and being high-priced, is still limited to research use at the present time.

With regard to a grasping hand capable of fulfilling flexible operations, a pneumatic actuator, which is one constituent element, is known as described in Japanese Patent No. 3226219. This actuator is so designed that a plurality of partition walls are provided in a cylindrical elastic member to define pressure chambers, wherein each of the pressure chambers is to be pressurized to flex the elastic member. This actuator is combined in a plurality to form a grasping hand, thus being enabled to grasp objects.

However, since there is provided no constituent element equivalent to a human bone, there would arise an issue in that it may become hard for the actuator to continue grasping an object depending on its configuration and weight. Also, in order to drive each actuator, there would arise a need for drive tubes of a number corresponding to a number of internal pressure chambers of cylindrical elastic members.

In this case, the number of tubes would increase, causing a load more than a flexural operation force of the actuators to be involved depending on rigidity of the tubes, thereby posing a possibility that the actuators might no longer sufficiently flex.

With regard to these already reported grasping hands, there has been disclosed no grasping hand which comprises pneumatic pressure as a drive source and which includes a laminated-type pneumatic tube formation member, a planar-type joint-portion flexural deformation member and a bone member having a joint portion according to the present invention.

For introduction of robots for performing various kinds of aid into human living space, there is a need for a multi-joint portion drive mechanism for fulfilling a grasping hand that serves as a main part for aid operation. Also, the grasping hand provided with the multi-joint portion drive mechanism is required to have a grasping performance for grasping various and diverse objects and to be safe, simple in structure, and implementable with low cost.

An object of the present invention is to provide a laminated-type multi-joint portion drive mechanism, as well as a manufacturing method therefor, and further to provide a grasping hand and a robot arm provided with the laminated-type multi-joint portion drive mechanism as well as a robot provided with the grasping hand and the robot arm each of which solves the foregoing issues and each of which is capable of implementing a grasping hand having a grasping performance for various and diverse objects, and which is safe and simple in terms of structure and implementable with low cost.

SUMMARY OF THE INVENTION

In accomplishing the above object, the present invention has the following constitution.

According to a first aspect of the present invention, there is provided a laminated-type multi-joint portion drive mechanism comprising:

a pneumatic drive source for providing pneumatic pressure;

a bone member having at least two elastically-deformable elastic deformation portions;

a laminated-type pneumatic tube member having at least two line-tubes which are fixed so as to be laid on the bone member and which are connected to the pneumatic drive source; and a planar-type joint-portion flexural deformation member which is fixed so as to be laid on the laminated-type pneumatic tube member and which has pneumatic operation chambers placed at joint portions confronting the elastic deformation portions of the bone member, respectively, and connected to the tubes, respectively, wherein with pneumatic pressure applied to one of the pneumatic operation chambers, the joint portion corresponding to the pneumatic operation chamber to which the pneumatic pressure is applied is deformable.

According to another aspect of the present invention, there is provided a method for manufacturing the laminated-type multi-joint portion drive mechanism as defined in the first aspect, the method comprising:

integrally molding the bone member having elastic hinges at least the elastic deformation portions; and stacking and bonding the laminated-type pneumatic tube member and the planar-type joint-portion flexural deformation member on the bone member.

According to another aspect of the present invention, there is provided a grasping hand having the laminated-type multi-joint portion drive mechanism as defined in the first aspect which is arranged face to face to be capable of grasping an object.

According to another aspect of the present invention, there is provided a robot arm using the laminated-type multi-joint portion drive mechanism as defined in the first aspect.

According to another aspect of the present invention, there is provided a robot arm using the laminated-type multi-joint portion drive mechanism as defined in the first aspect, and providing the grasping hand at an end of the robot arm.

According to another aspect of the present invention, there is provided a robot comprising: a robot arm as described below and the grasping hand at an end of the robot arm.

BRIEF DESCRIPTION OF DRAWINGS

These and other aspects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1:
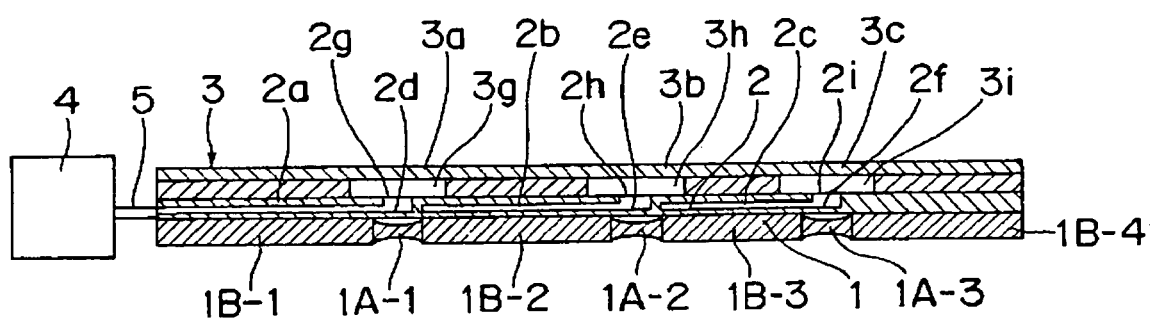
FIG. 1 is a sectional view of a laminated-type multi-joint portion drive mechanism according to a first embodiment of the present invention.

Before description of the present invention proceeds, it is to be noted that like parts are designated by like reference numerals throughout the accompanying drawings.

Hereinbelow, a first embodiment of the present invention is described in detail with reference to the accompanying drawings.

Before the embodiment is described below in detail with reference to the accompanying drawings, various aspects of the present invention are first described.

According to a first aspect of the present invention, there is provided a laminated-type multi-joint portion drive mechanism comprising:

a pneumatic drive source for providing pneumatic pressure;

a bone member having at least two elastically-deformable elastic deformation portions;

a laminated-type pneumatic tube member having at least two line-tubes which are fixed so as to be laid on the bone member and which are connected to the pneumatic drive source; and a planar-type joint-portion flexural deformation member which is fixed so as to be laid on the laminated-type pneumatic tube member and which has pneumatic operation chambers placed at joint portions confronting the elastic deformation portions of the bone member, respectively, and connected to the tubes, respectively, wherein with pneumatic pressure applied to one of the pneumatic operation chambers, the joint portion corresponding to the pneumatic operation chamber to which the pneumatic pressure is applied is deformable.

With this constitution, the laminated-type multi-joint portion drive mechanism has a function of, by taking advantage of flexible drive that is an advantage of conventional pneumatic actuators, and by overcoming complexities of tubing, making it possible to realize a joint-portion drive mechanism which is smaller-size, more lightweight, and easier to manufacture as compared with actuators typified by motors, and achieving an improvement in grasping rigidity by virtue of its having the bone member.

According to a second aspect of the present invention, there is provided the laminated-type multi-joint portion drive mechanism as defined in the first aspect, wherein the laminated-type pneumatic tube member is so formed that a plurality of molded organic films are stacked one on another to form the tubes.

With this constitution, the laminated-type multi-joint portion drive mechanism has a function of making it easier to manufacture the laminated-type multi-joint portion drive mechanism and making it possible to achieve a cost reduction by virtue of its adopting a laminated structure of tubes which otherwise might affect drive of the joint portions because of their complications in making up a drive mechanism using pneumatic pressure.

According to a third aspect of the present invention, there is provided the laminated-type multi-joint portion drive mechanism as defined in the first or second aspect, wherein the planar-type joint-portion flexural deformation member comprises a constrained layer for imparting a directivity of expandability and contractibility to the planar-type joint-portion flexural deformation member along its longitudinal direction, wherein when the joint portions of the planar-type joint-portion flexural deformation member are expanded, a flexural operation is performed by guidance of the bone member.

With this constitution, the laminated-type multi-joint portion drive mechanism has a function of making it possible to transform energy, which is supplied to the joint-portion drive mechanism utilizing pneumatic pressure, into flexural operation of the joint portions with high efficiency.

According to a fourth aspect of the present invention, there is provided the laminated-type multi-joint portion drive mechanism as defined in any one of the first to third aspects, wherein the plurality of elastic deformation portions of the bone member are elastic hinge portions, respectively.

With this constitution, the laminated-type multi-joint portion drive mechanism has a function of making it possible to integrally manufacture the multi-joint portions, or even a multi-finger configuration, by machining the joint portions alone into an elastic-hinge configuration, other than individually manufacturing respective joint portions of the bone member that has a plurality of joint portions.

According to a fifth aspect of the present invention, there is provided the laminated-type multi-joint portion drive mechanism as defined in any one of the first to fourth aspects, wherein the constrained layer of the planar-type joint-portion flexural deformation member is a flexible organic film material in which reticulate fiber is knitted.

With this constitution, the laminated-type multi-joint portion drive mechanism has a function of making it possible to transform energy, which is supplied to the pneumatic pressure source, into flexural operation of the joint portions with high efficiency by restricting a direction of expansion and contraction of the planar-type joint-portion flexural deformation member to a particular direction by use of reticulate fiber.

According to a sixth aspect of the present invention, there is provided a method for manufacturing the laminated-type multi-joint portion drive mechanism as defined in any one of the first to fifth aspects, the method comprising:

integrally molding the bone member having elastic hinges at least the elastic deformation portions; and stacking and bonding the laminated-type pneumatic tube member and the planar-type joint-portion flexural deformation member on the bone member.

With this constitution, the laminated-type multi-joint portion drive mechanism is manufactured through processes of molding layers layer by layer, and tightly bonding together the layers. Therefore, the laminated-type multi-joint portion drive mechanism has a function of making it possible to manufacture the laminated-type multi-joint portion drive mechanism with low cost by virtue of suppressing component parts count to a minimum.

According to a seventh aspect of the present invention, there is provided a grasping hand having the laminated-type multi-joint portion drive mechanism as defined in any one of the first to fifth aspects which is arranged face to face to be capable of grasping an object.

With this constitution, the grasping hand has a function of making it possible to achieve grasping of various and diverse objects, and provide safety to persons who use the grasping hand in a flexible operation.

According to an eighth aspect of the present invention, there is provided a robot arm using the laminated-type multi-joint portion drive mechanism as defined in any one of the first to fifth aspects.

With this constitution, the robot arm is enabled to provide safety to persons who use the robot arm as well as a flexible positioning operation.

According to a ninth aspect of the present invention, there is provided a robot arm using the laminated-type multi-joint portion drive mechanism as defined in any one of the first to fifth aspects, and providing the grasping hand as defined in the seventh aspect at an end of the robot arm.

With this constitution, since the grasping hand, in which the laminated-type multi-joint portion drive mechanism is arranged face to face, is provided at an end of the robot arm, the robot arm is enabled to safely position the grasping hand against a grasping object located within a movable range, thus making it possible to provide safety to persons who use the robot arm as well as a flexible positioning operation.

According to a tenth aspect of the present invention, there is provided a grasping hand having the laminated-type multi-joint portion drive mechanism as defined in the first or second aspect which is arranged face to face to be capable of grasping an object.

According to an eleventh aspect of the present invention, there is provided a grasping hand having the laminated-type multi-joint portion drive mechanism as defined in the third aspect which is arranged face to face to be capable of grasping an object.

According to a twelfth aspect of the present invention, there is provided a grasping hand having the laminated-type multi-joint portion drive mechanism as defined in the fourth aspect which is arranged face to face to be capable of grasping an object.

According to a thirteenth aspect of the present invention, there is provided a grasping hand having the laminated-type multi-joint portion drive mechanism as defined in the fifth aspect which is arranged face to face to be capable of grasping an object.

According to a fourteenth aspect of the present invention, there is provided a grasping hand having the laminated-type multi-joint portion drive mechanism as defined in the sixth aspect which is arranged face to face to be capable of grasping an object.

According to a fifteenth aspect of the present invention, there is provided a robot arm using the laminated-type multi-joint portion drive mechanism as defined in the first or second aspect.

According to a sixteenth aspect of the present invention, there is provided a robot arm using the laminated-type multi-joint portion drive mechanism as defined in the third aspect.

According to a seventeenth aspect of the present invention, there is provided a robot arm using the laminated-type multi-joint portion drive mechanism as defined in the fourth aspect.

According to an eighteenth aspect of the present invention, there is provided a robot arm providing the grasping hand as defined in the tenth aspect at an end of the arm.

According to a nineteenth aspect of the present invention, there is provided a robot arm providing the grasping hand as defined in the eleventh aspect at an end of the arm.

According to a twentieth aspect of the present invention, there is provided a robot arm providing the grasping hand as defined in the twelfth aspect at an end of the arm.

According to a twenty-first aspect of the present invention, there is provided a robot comprising: the robot arm which comprises the laminated-type multi-joint portion drive mechanism as defined in the first or second aspect; and the grasping hand as defined in the tenth aspect provided at an end of the robot arm.

Hereinbelow, embodiments of the present invention are explained with reference to FIGS. 1 to 22.

First Embodiment

FIG. 1 is a sectional view of a laminated-type multi-joint portion drive mechanism according to a first embodiment of the present invention. The laminated-type multi-joint portion drive mechanism shown in FIG. 1 is formed through steps of stacking a plate-shaped laminated-type pneumatic tube formation member 2 and a planar-type joint-portion flexural deformation member 3 on a bone member 1 having elastic hinge portions 1A provided at a plurality of joint portions, respectively, and then tightly joining these members by adhesively bonding them together with an adhesive such as polyimide-based adhesive. This multi-joint portion drive mechanism includes a pneumatic drive source 4 such as an air cylinder for feeding compressed air or the like, a pneumatic pressure introduction tube 5 for implementing a pneumatic introductory tube connected to the pneumatic drive source 4, the laminated-type pneumatic tube formation member 2 having gas passage through holes 2g, 2h, 2i connected to the pneumatic pressure introduction tube 5 via a plurality of tubes 2a, 2b, 2c having solenoid valves 17a, 17b, 17c, respectively, and the planar-type joint-portion flexural deformation member 3 tightly joined with the laminated-type pneumatic tube formation member 2, where pneumatic pressure is applied from the pneumatic drive source 4 to the gas passage through holes 2g, 2h, 2i of the laminated-type pneumatic tube formation member 2 so that the planar-type joint-portion flexural deformation member 3 is expanded, thus achieving flexure of the joint portions flexed with the elastic hinge portions 1A of the bone member 1 serving as flexure points.

Figure 2A:
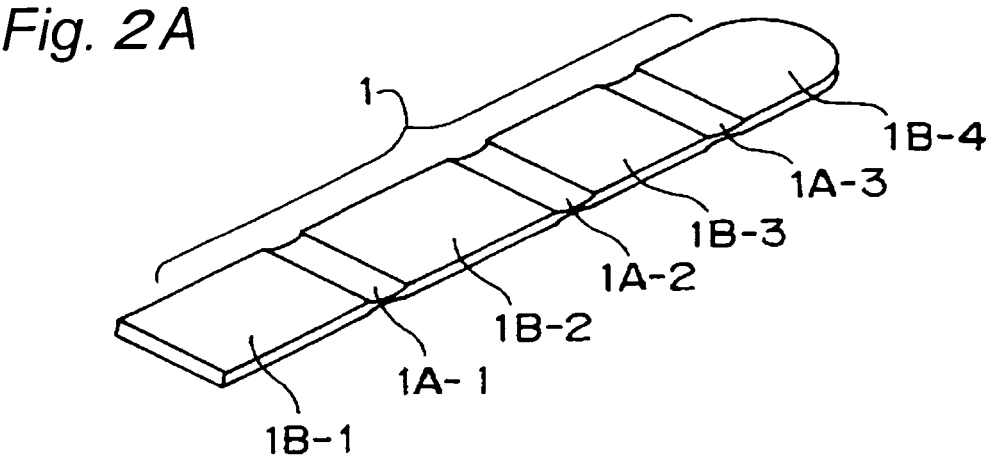
FIGS. 2A, 2B, 2C are a perspective view, a side view and an explanatory view, respectively, of a bone member in which an elastic hinge portion is provided at each joint portion of the laminated-type multi-joint portion drive mechanism according to the first embodiment.
Figure 2B:
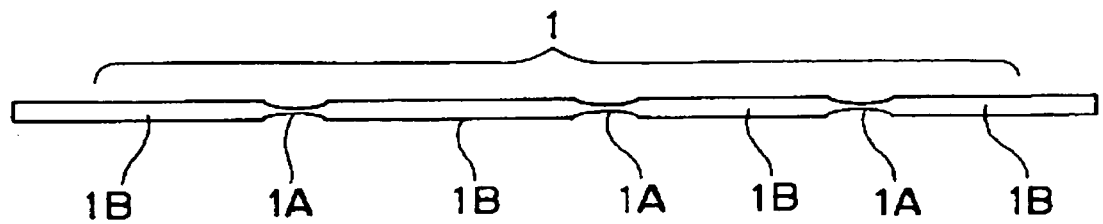
Figure 2C:
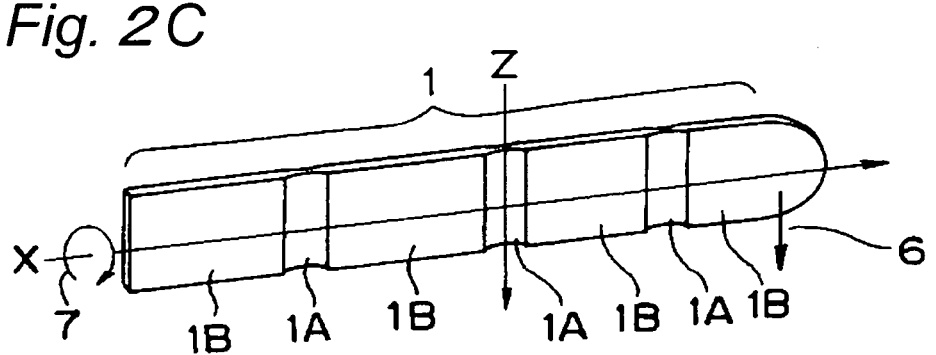

Referring to FIGS. 1 and 2C, the bone member 1 includes a first bone member body portion 1B-1, a first elastic hinge portion 1A-1, a second bone member body portion 1B-2, a second elastic hinge portion 1A-2, a third bone member body portion 1B-3, a third elastic hinge portion 1A-3, and a fourth bone member body portion 1B-4, with these members being arranged and connected in adjacency to one another from a base end portion side of the bone member 1 toward a fore end portion side thereof. In the following description, when a description is common to the first to fourth bone member body portions 1B-1 to 1B-4, the description is made with representation by the bone member body portions 1B, and likewise when a description is common to the first to third elastic hinge portions 1A-1 to 1A-3, the description is made with representation by the elastic hinge portions 1A. The elastic hinge portions 1A are formed thinner and thus elastically deformable, as compared with the bone member body portions 1B.

In the bone member 1, although the elastic hinge portions 1A are provided three in number so that a number of joint portions of the laminated-type multi-joint portion drive mechanism is set as three, the number of joint portions may be changed depending on an environment and objects with which this laminated-type multi-joint portion drive mechanism is put into use. Also, a width of the laminated-type multi-joint portion drive mechanism or a length of individual member portions may also be changed likewise.

The laminated-type multi-joint portion drive mechanism is explained in terms of its structure with reference to its manufacturing procedure.

Figure 10:
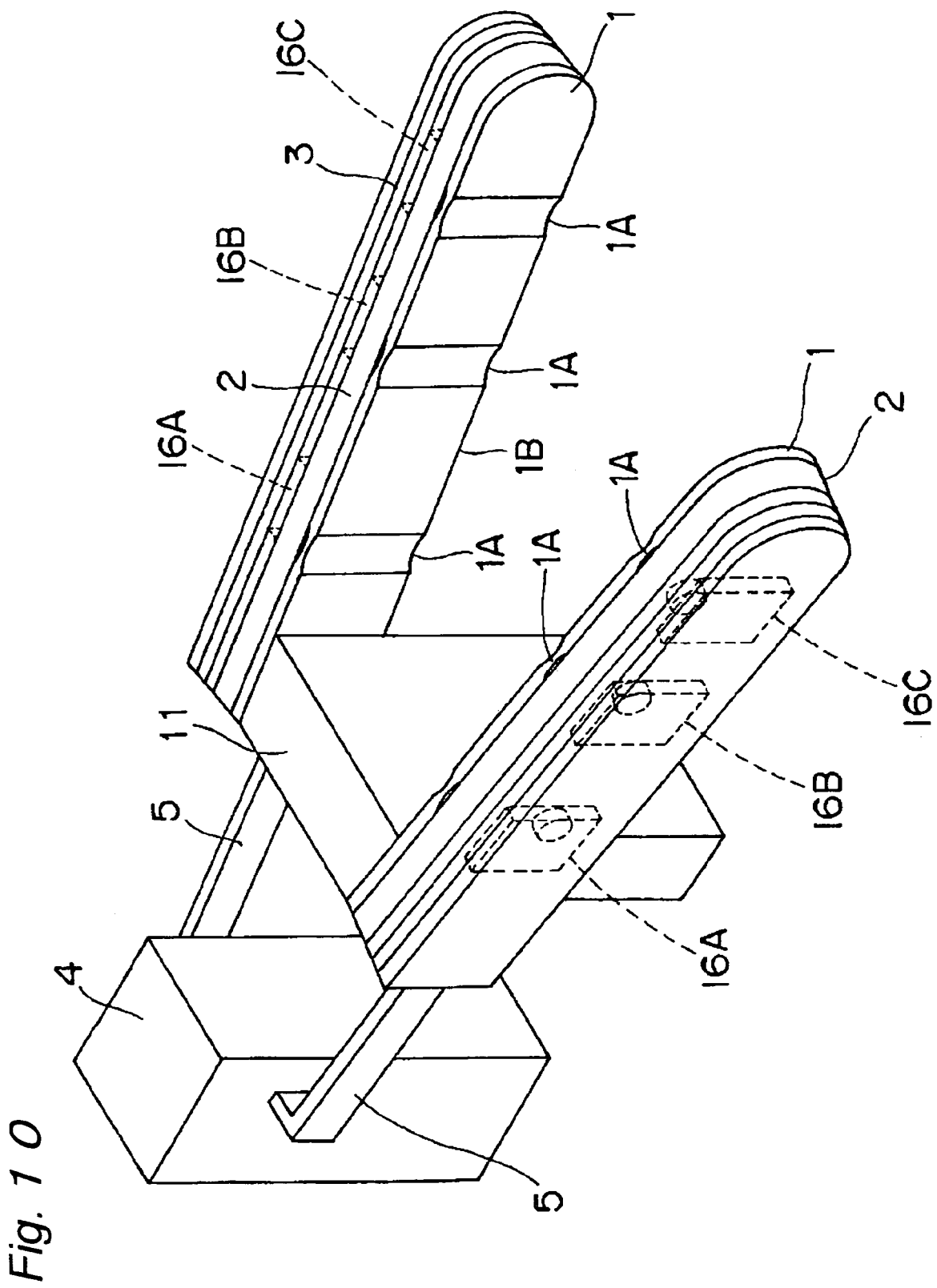
FIG. 10 is a perspective view of a model in a case where a constrained layer of each planar-type joint-portion flexural deformation member of a grasping hand provided with a pair of planar-type joint-portion flexural deformation members according to a second embodiment of the present invention is restricted to a particular direction for its direction of expansion and contraction and where a bone member having an elastic hinge at each joint portion is provided.

FIGS. 2A and 2B are a perspective view and a sectional view, respectively, of the bone member 1 in which an elastic hinge portion 1A is provided at each joint portion of the laminated-type multi-joint portion drive mechanism. The bone member 1 is characterized by using high-rigidity, lightweight organic material (e.g., polyethylene terephthalate or polypropylene) and integrally molding its external configuration, the elastic hinge portions 1A, and the bone member body portions 1B. It is noted that the elastic hinge portion 1A refers to a portion of the bone member 1 which serves for flexure of the bone member 1 and which is molded so as to be about ½ to ¼ as thick as the bone member body portion 1B. In this embodiment of the present invention, whereas use of a single material for integral molding of the bone member 1 makes the elastic hinge portions 1A and the bone member body portions 1B equal in terms of modulus of elasticity to each other, it is possible to make the elastic hinge portions 1A preferentially flexed relative to the bone member body portions 1B due to a thickness difference therebetween. An example of material of the bone member 1 is polypropylene. Polypropylene can be considered to be capable of improving reliability of the multi-joint portion drive mechanism that requires iterative operations because polypropylene itself has a hinge property and high reiterative flexural strength. An example of the integral molding of the bone member 1 is a molding using a metal mold. Molding a large-width plate material and thereafter cutting and separating the material at desired widths allows a multiplicity of bone members 1 to be molded and manufactured with ease. As another manufacturing method for the bone member 1, there is provided a thermal processing of plate material, where material texture of the elastic hinge portions 1A becomes dense by forming the elastic hinge portions 1A by heating and compression, thereby providing a possibility that reiterative flexural strength of the joint portions can also be improved. FIG. 2C is a perspective view showing dynamic characteristics of the elastic hinge portions 1A. The bone member 1 is so configured with individual bone member body portions 1B being connected to one another with the elastic hinge portions 1A serving as joint portions, such that a force 6 in a Z-axis direction applied to the bone member 1 can be supported as a moment force 7 on a base end side of the bone member 1. Properties of this moment force 7 are effective regardless of a flexural angle of the elastic hinge portions 1A under a condition of high torsional rigidity of the elastic hinge portions 1A and moreover independent of a force generated by the planar-type joint-portion flexural deformation member 3. As a result of these characteristics, as shown in FIG. 10, when a pair of laminated-type multi-joint portion drive mechanisms are arranged face to face like a hand, a force generated along a gravity drop direction (the Z-axis direction of FIG. 2C) of a grasping object which is vertical to a grasping direction (a direction perpendicular to both Z-axis direction and X-axis direction of FIG. 2C, i.e., a thicknesswise direction of the bone member 1) can be supported by a structural strength of the bone member 1, so that energy supplied from the pneumatic drive source 4 can efficiently be transformed into grasping force.

Figure 3A:
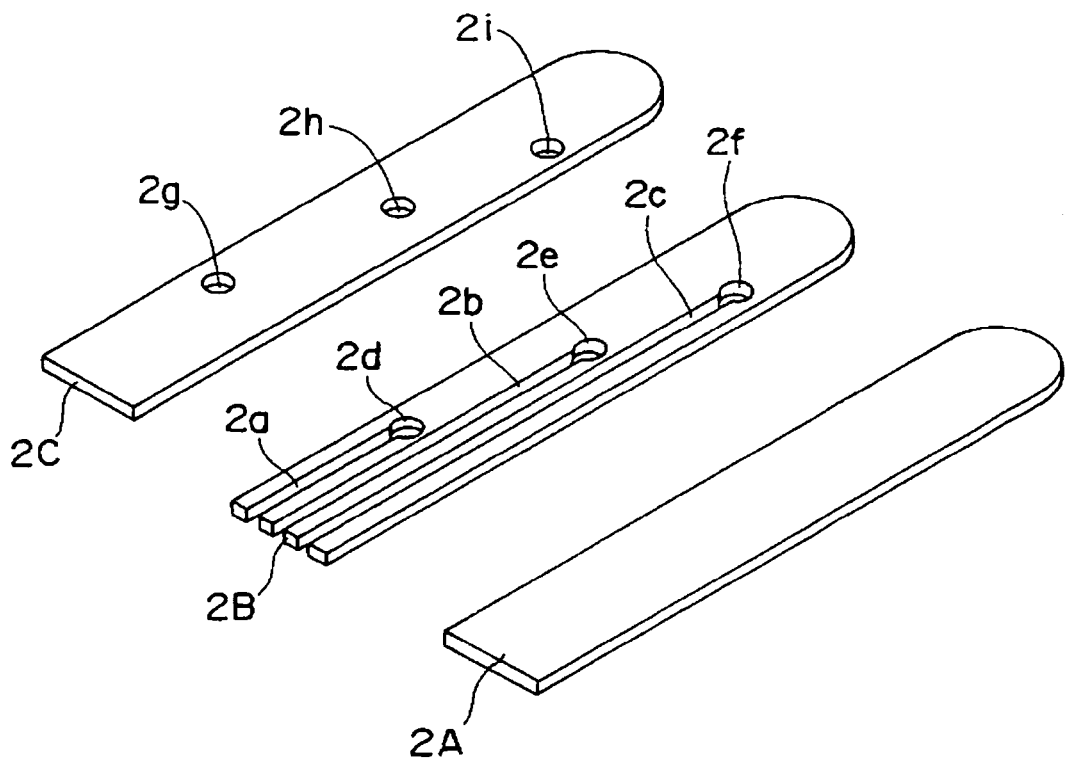
FIGS. 3A and 3B are an exploded perspective view of constituent elements of a laminated-type pneumatic tube formation member of the laminated-type multi-joint portion drive mechanism according to the first embodiment, and a schematic enlarged sectional view of the laminated-type pneumatic tube formation member, respectively.
Figure 3B:
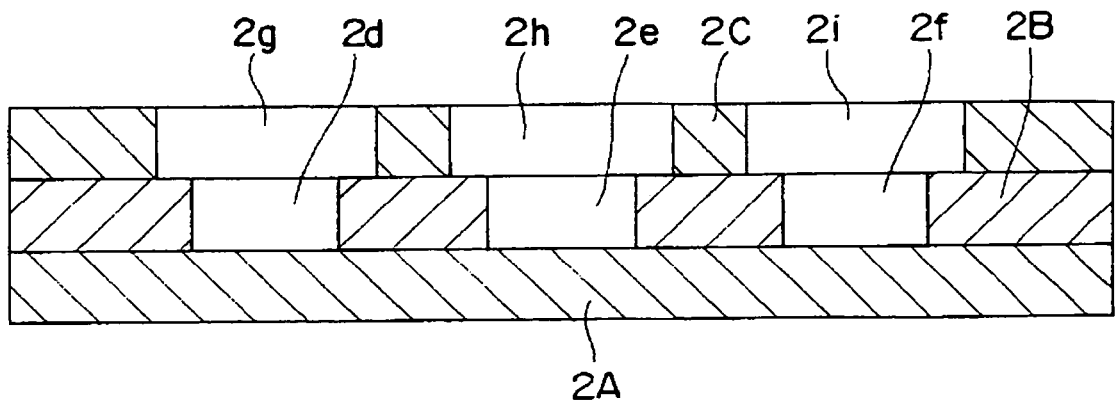
Figure 4A:
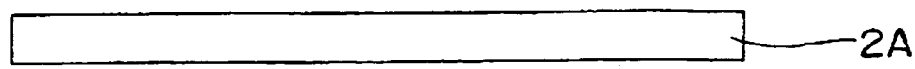
FIGS. 4A, 4B, 4C, 4D, 4E and 4F are sectional views, respectively, of the laminated-type pneumatic tube formation member for explaining fabrication processes of the laminated-type pneumatic tube formation member of the laminated-type multi-joint portion drive mechanism according to the first embodiment.
Figure 4B:
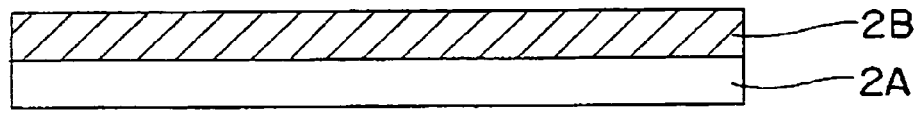
Figure 4C:
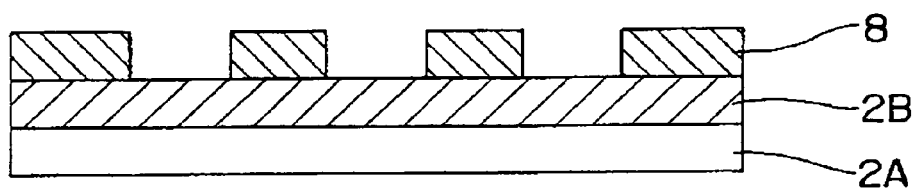
Figure 4D:
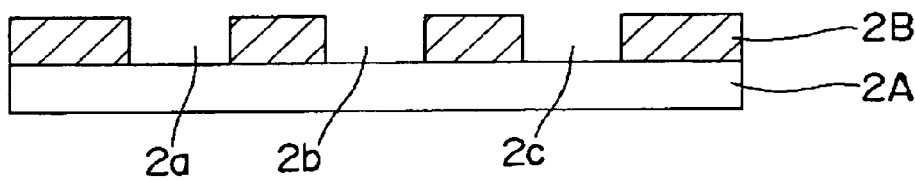
Figure 4E:
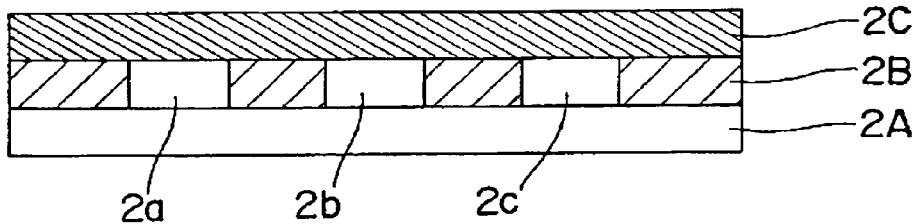
Figure 4F:
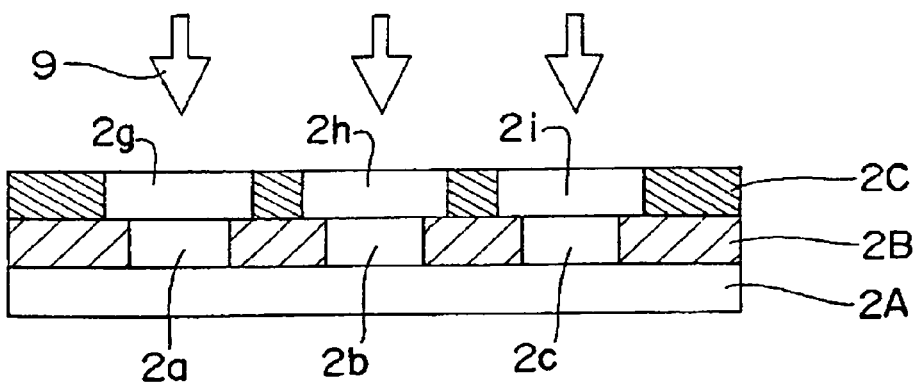

FIGS. 3A and 3B show an exploded perspective view of organic films 2A, 2B, 2C, which are constituent elements of the laminated-type pneumatic tube formation member 2 of the laminated-type multi-joint portion drive mechanism, and a sectional view of the laminated-type pneumatic tube formation member 2 after stacking of the organic films 2A, 2B, 2C. The laminated-type pneumatic tube formation member 2, as shown in FIG. 3A, is formed from the organic films 2A, 2B, 2C which are identical in terms of external configuration to the bone member 1 and identical in terms of external configuration to each other, and which are tightly stacked one on another. That is, on a first organic film 2A that serves as a base material, a second organic film 2B in which a tube is to be provided is tightly joined, then a tube shaping process is performed by photolithography or the like, and a third organic film 2C is tightly joined thereon, followed by forming through holes for introduction of pneumatic pressure into the planar-type joint-portion flexural deformation member 3. Thus, the second organic film 2B has three tubes 2a, 2b, 2c which extend parallel to one another and along a longitudinal direction of the laminated-type pneumatic tube formation member 2 so as to penetrate in its thicknesswise direction. The first laminated-type pneumatic tube 2a is shortest, where a first circular gas supply hole 2d which has a diameter larger than a tube width and which penetrates in a thicknesswise direction is formed at a distal end of the tube. The second laminated-type pneumatic tube 2b is longer than the first laminated-type pneumatic tube 2a, where a circular gas supply hole 2e which has a diameter larger than the tube width and which penetrates in the thicknesswise direction is formed at a distal end of this tube. The third laminated-type pneumatic tube 2c is longer than the second laminated-type pneumatic tube 2b, where a circular gas supply hole 2f which has a diameter larger than the tube width and which penetrates in the thicknesswise direction is formed at a distal end of this tube.

Also, the first organic film 2A is formed into a plate shape in which through holes are not formed at all.

Meanwhile, near a base end portion of the third organic film 2C is formed a first circular gas passage through hole 2g which communicates with the first circular gas supply hole 2d of the second organic film 2B and which is larger in diameter than the first circular gas supply hole 2d and which penetrates in the thicknesswise direction. At an intermediate portion between the base end portion and a distal end portion is formed a second circular gas passage through hole 2h which communicates with the second circular gas supply hole 2e of the second organic film 2B and which is larger in diameter than the second circular gas supply hole 2e and which penetrates in the thicknesswise direction. At an intermediate portion between the base end portion and the distal end portion is formed a third circular gas passage through hole 2i which communicates with the third circular gas supply hole 2f of the second organic film 2B and which is larger in diameter than the third circular gas supply hole 2f and which penetrates in the thicknesswise direction.

Accordingly, individual tubes 2a, 2b, 2c of the second organic film 2B are formed as passages between the third organic film 2C and the first organic film 2A.

As an example of fabrication of this laminated-type pneumatic tube formation member 2, a fabrication flow with polyimide film and photosensitive polyimide used as the material is shown in FIGS. 4A to 4F. First, a polyimide film (see FIG. 4A), which is to form the first organic film 2A, as a base material, is coated with photosensitive polyimide, which is to form the second organic film 2B (see FIG. 4B). This coating is followed by pre-baking, and thereafter the photosensitive polyimide is exposed to light with a photomask 8 having a tube pattern corresponding to the tubes 2a, 2b, 2c (see FIG. 4C), then, development and post-baking are performed to form the tubes 2a, 2b, 2c (see FIG. 4D). On this resulting film, a polyimide film with an adhesive thereon which is to form the third organic film 2C is bonded in an airtight state (see FIG. 4E), and a formation process for the first circular gas passage through hole 2g, the second circular gas passage through hole 2h, and the third circular gas passage through hole 2i, by which the tubes 2a, 2b, 2c and the planar-type joint-portion flexural deformation member 3 are connected to each other, is performed by laser beam machining with a laser beam 9 to form the laminated-type pneumatic tube formation member 2 (see FIG. 4F). Alternatively, the third organic film 2C, which is a polyimide film with adhesive attached and in which the first circular gas passage through hole 2g, the second circular gas passage through hole 2h, and the third circular gas passage through hole 2i have previously been formed, may be aligned and bonded in an airtight state on the second organic film 2B and the first organic film 2A, in which the tubes 2a, 2b, 2c have been formed. By arranging and forming the tubes 2a, 2b, 2c on a plane in such a manner, it becomes possible to integrally mold the tubes 2a, 2b, 2c for allowing individual joint portions of the multi-joint portion drive mechanism to be operated independently of one another.

Between the tubes 2a, 2b, 2c and the pneumatic pressure introduction tube 5 are arranged solenoid valves, respectively, so that air supply into the tubes 2a, 2b, 2c can be made and halted independently and individually depending on opening and closing of the solenoid valves.

Figure 5A:
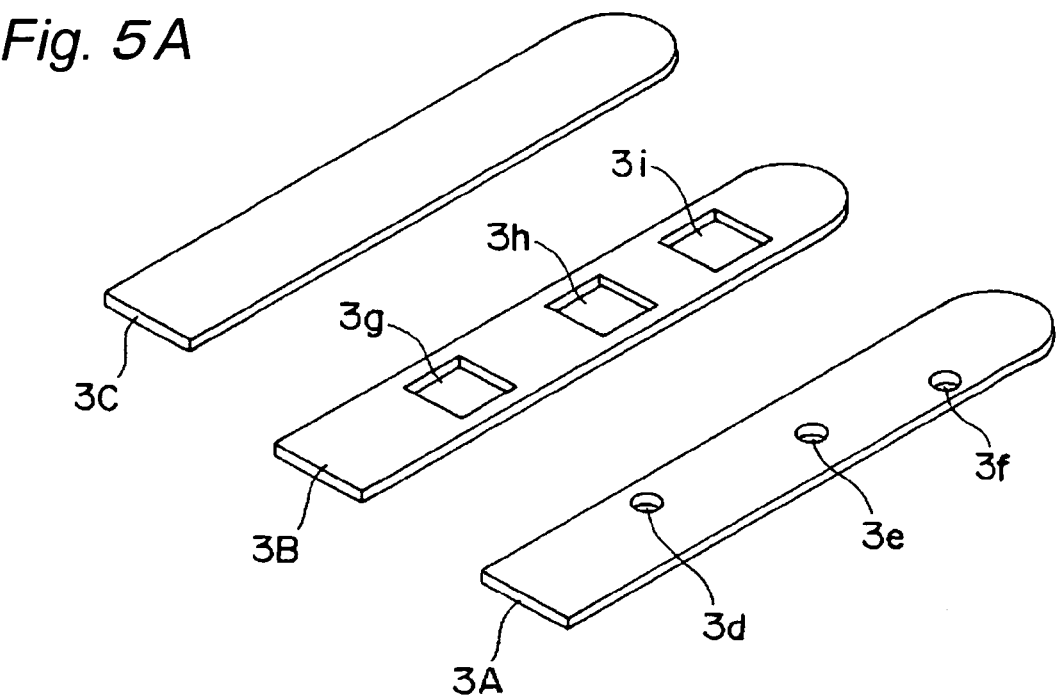
FIGS. 5A and 5B are an exploded perspective view of constituent elements of a planar-type joint-portion flexural deformation member of the laminated-type multi-joint portion drive mechanism according to the first embodiment, and an enlarged partial sectional view of a planar-type joint-portion flexural deformation member, respectively.
Figure 5B:
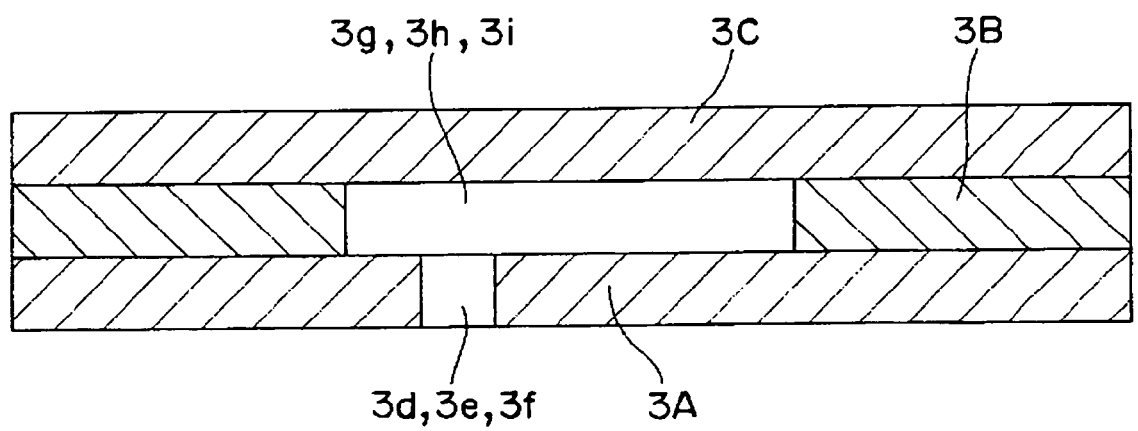

FIGS. 5A and 5B show an exploded perspective view of a base member 3A, an elastic layer 3B, and a constrained layer 3C, which are constituent elements of the planar-type joint-portion flexural deformation member 3, and a sectional view of the planar-type joint-portion flexural deformation member 3 after stacking of the base member 3A, the elastic layer 3B, and the constrained layer 3C. The planar-type joint-portion flexural deformation member 3 is so formed that elastic layer 3B, formed of an elastic material and having a rectangular first pneumatic operation hole 3g, a rectangular second pneumatic operation hole 3h, and a rectangular third pneumatic operation hole 3i formed therein so as to extend through the elastic layer 3B and to serve as voids that form pneumatic operation chambers 16, is hermetically bonded and joined on the base member 3A having a first circular gas supply hole 3d, a second circular gas supply hole 3e, and a third circular gas supply hole 3f which communicate with the first pneumatic operation hole 3g, the second pneumatic operation hole 3h, and the third pneumatic operation hole 3i, respectively and independently, and which are smaller in diameter than those, respectively, and further which extend through the base member 3A; and moreover, the constrained layer 3C which is shaped into a flat plate with no through holes and which imparts a directivity to expansion and contraction of the laminated-type multi-joint portion drive mechanism is hermetically bonded and joined thereon.

Figure 6A:
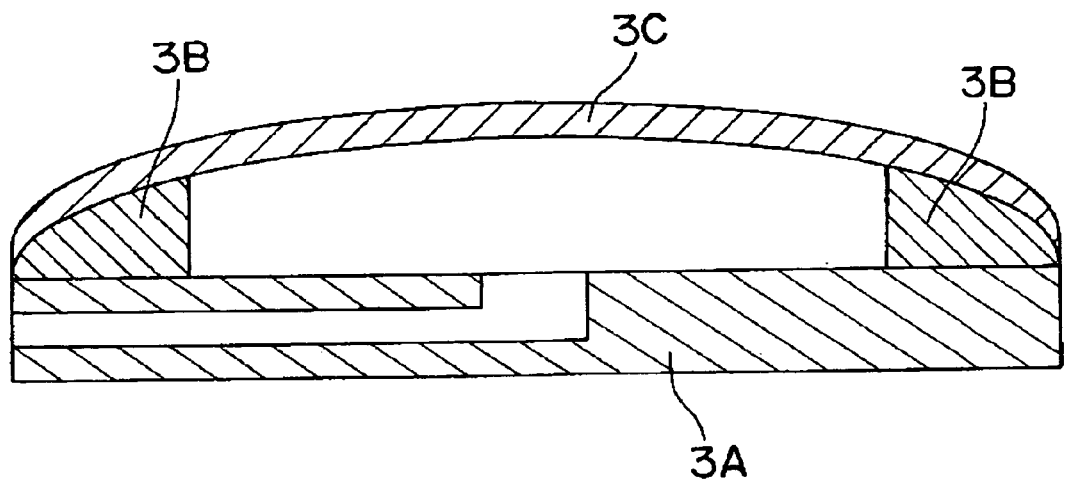
FIGS. 6A and 6B are a sectional view of a model for explaining a drive state of a joint portion in a case where a constrained layer of the planar-type joint-portion flexural deformation member of the laminated-type multi-joint portion drive mechanism according to the first embodiment is not restricted to any particular direction for its direction of expansion and contraction, and a sectional view of a model for explaining a drive state of a joint portion in a case where the constrained layer is restricted to a particular direction for its direction of expansion and contraction, respectively.

In this case, FIG. 6A is a sectional view of a model of joint portion drive in a case where the constrained layer 3C is not restricted in its direction of expansion and contraction thereof, thereby representing a configuration resulting when the planar-type joint-portion flexural deformation member 3 is expanded upward, as viewed in FIG. 6A, by application of pneumatic pressure under that condition. In this case, the constrained layer 3C itself would preferentially expand due to application of pneumatic pressure, thereby inhibiting a flexural operation of an intended joint portion.

Figure 6B:
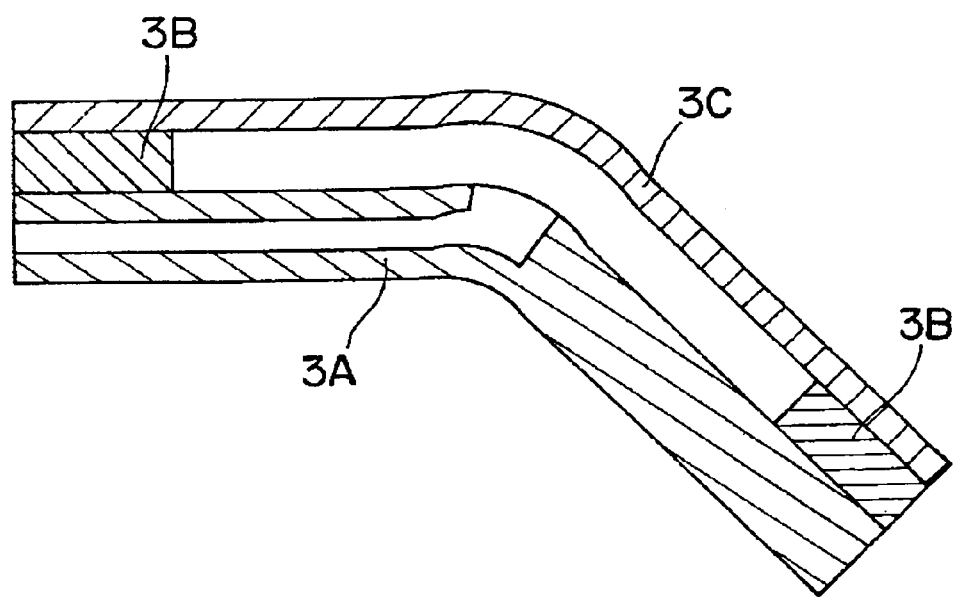

In contrast to this, FIG. 6B is a sectional view of a model of joint portion drive in a case where an expansion-and-contraction direction of the constrained layer 3C is restricted to one direction (i.e., a longitudinal direction of the constrained layer 3C), thereby representing a configuration resulting when the planar-type joint-portion flexural deformation member 3 is expanded by application of pneumatic pressure under that condition. Accordingly, by the constrained layer 3C being expanded and contracted in one direction, it becomes possible to efficiently transform energy supplied from the pneumatic drive source 4 into flexural operation of the joint portion.

Figure 7A:
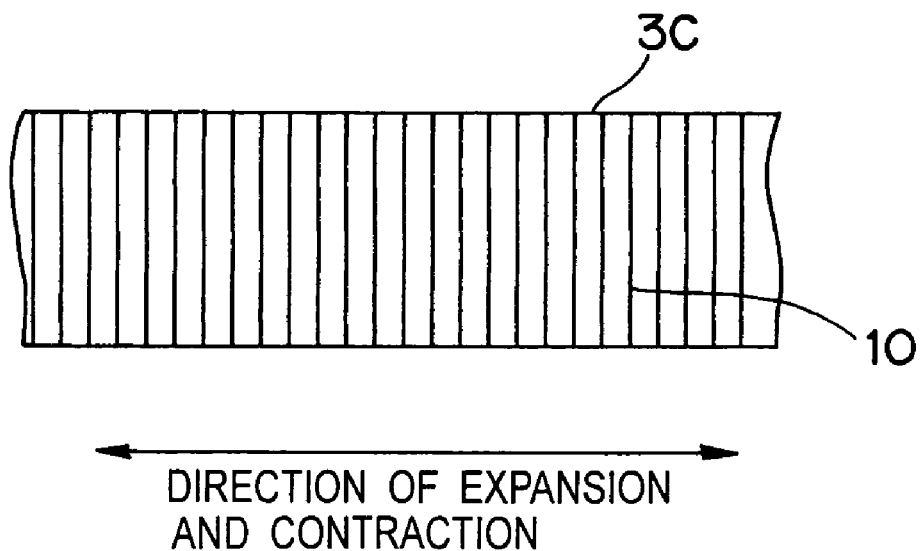
FIGS. 7A and 7B are plan views of a constrained layer in which fiber is knitted, and a model representing expansion and contraction in a case where pneumatic pressure is applied to the constrained layer, respectively.
Figure 7B:
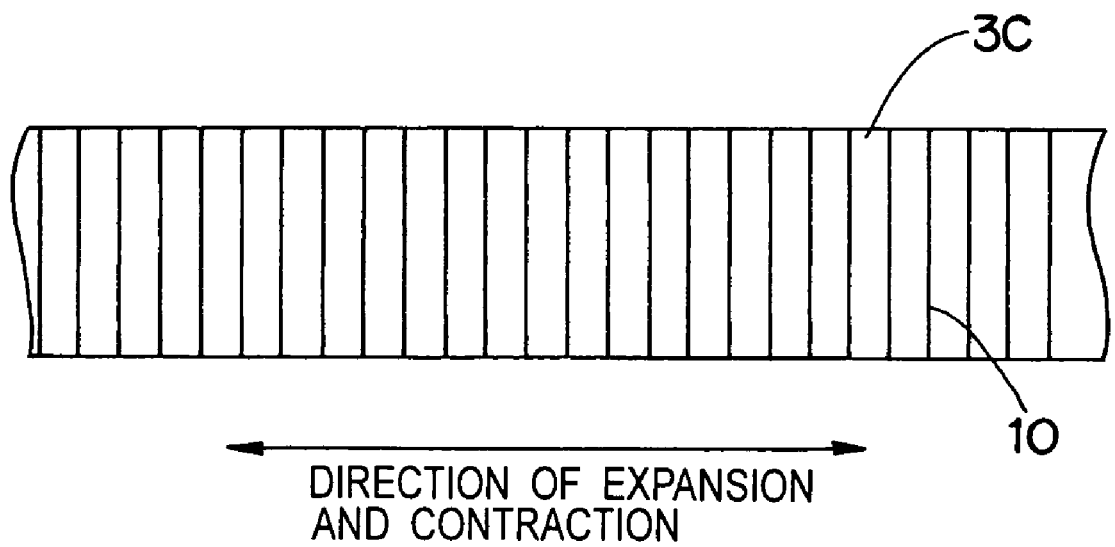

In order to restrict the expansion-and-contraction direction of the constrained layer 3C to one direction, i.e., the longitudinal direction of the constrained layer 3C, it is effective to mold the constrained layer 3C with a flexible organic material in which fiber 10 has been knitted along a direction perpendicular to the expansion-and-contraction direction of the constrained layer 3C as shown in FIG. 7A. FIG. 7B shows a plan view of a model representing an expanded state of the constrained layer 3C in which the fiber 10 has been knitted along a direction perpendicular to the expansion-and-contraction direction in a case where pneumatic pressure is applied to the constrained layer 3C. The constrained layer 3C is expanded and contracted by elasticity of the organic material in a direction (the left-and-right direction in FIGS. 7A and 7B, i.e., the longitudinal direction of the constrained layer 3C) perpendicular to the fiber 10 oriented along the up-and-down direction as viewed in FIGS. 7A and 7B, while an expansion-and-contraction restrictive force due to a length of the fiber 10 acts along a direction parallel to the fiber 10 (the up-and-down direction in FIGS. 7A and 7B, i.e., a widthwise direction of the constrained layer 3C) so that the constrained layer 3C can be restricted in its expansion and contraction.

Figure 8:
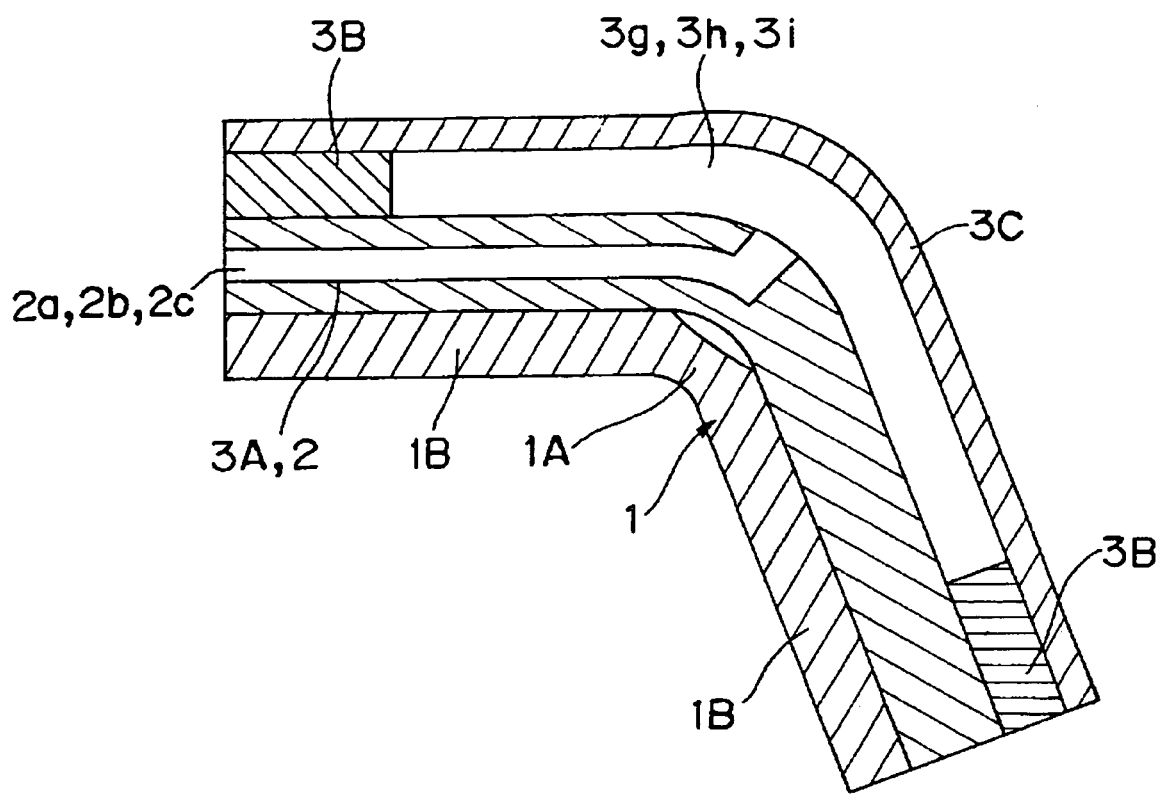
FIG. 8 is a sectional view of a model for explaining a drive state of a joint portion in a case where the constrained layer of a planar-type joint-portion flexural deformation member of the laminated-type multi-joint portion drive mechanism according to the first embodiment is restricted to a particular direction for its direction of expansion and contraction.

FIG. 8 is a sectional view of a model in a case where the constrained layer 3C is restricted to a particular direction of its expansion and contraction (i.e., the longitudinal direction of the constrained layer 3C) and where a bone member 1 having elastic hinges 1A at its joint portions is provided, with this figure representing a configuration resulting when the planar-type joint-portion flexural deformation member 3 is expanded by application of pneumatic pressure under that condition. By virtue of provision of the bone member 1 having the elastic hinges 1A at individual joint portions, respectively, in addition to the planar-type joint-portion flexural deformation member 3 that is driven by application of pneumatic pressure, portions other than the joint portions are further constrained, thus producing an effect that energy supplied from the pneumatic drive source 4 can be transformed into flexural operation of the joint portions more efficiently.

This flexural operation is described in detail. The first circular gas supply hole 2d and the first circular gas passage through hole 2g of the laminated-type pneumatic tube formation member 2, and the first circular gas supply hole 3d and the first pneumatic operation hole 3g of the planar-type joint-portion flexural deformation member 3, are connected together and arranged so as to confront an inner surface side of the first elastic hinge portion 1A-1. Then, pneumatic pressure, i.e., compressed air is supplied from the pneumatic drive source 4 to the first pneumatic operation hole 3g (first pneumatic operation chamber 16A) via the first laminated-type pneumatic tube 2a, the first circular gas supply hole 2d, the first circular gas passage through hole 2g, and the first circular gas supply hole 3d, by which a first joint portion 3a of the planar-type joint-portion flexural deformation member 3 near the first pneumatic operation chamber 16A is elastically deformed to extend along the longitudinal direction, so that the first bone member body portion 1B-1 and the second bone member body portion 1B-2 cause the first elastic hinge portion 1A-1 to be flexed so as to be positioned inward.

Similarly, the second circular gas supply hole 2e and the second circular gas passage through hole 2h of the laminated-type pneumatic tube formation member 2, and the second circular gas supply hole 3e and the second pneumatic operation hole 3h of the planar-type joint-portion flexural deformation member 3, are connected together and arranged so as to confront an inner surface side of the second elastic hinge portion 1A-2. Then, pneumatic pressure, i.e., compressed air is supplied from the pneumatic drive source 4 to the second pneumatic operation hole 3h (second pneumatic operation chamber 16B) via the second laminated-type pneumatic tube 2b, the second circular gas supply hole 2e, the second circular gas passage through hole 2h, and the second circular gas supply hole 3e, by which a second joint portion 3b of the planar-type joint-portion flexural deformation member 3 near the second pneumatic operation chamber 16B is elastically deformed to extend along the longitudinal direction, so that the second bone member body portion 1B-2 and the third bone member body portion 1B-3 cause the second elastic hinge portion 1A-2 to be flexed so as to be positioned inward.

Similarly, the third circular gas supply hole 2f and the third circular gas passage through hole 2i of the laminated-type pneumatic tube formation member 2, and the third circular gas supply hole 3f and the third pneumatic operation hole 3i of the planar-type joint-portion flexural deformation member 3, are connected together and arranged so as to confront an inner surface side of the third elastic hinge portion 1A-3. Then, pneumatic pressure, i.e., compressed air is supplied from the pneumatic drive source 4 to the third pneumatic operation hole 3i (third pneumatic operation chamber 16C) via the third laminated-type pneumatic tube 2c, the third circular gas supply hole 2f, the third circular gas passage through hole 2i, and the third circular gas supply hole 3f, by which a third joint portion 3c of the planar-type joint-portion flexural deformation member 3 near the third pneumatic operation chamber 16C is elastically deformed to extend along the longitudinal direction, so that the third bone member body portion 1B-3 and the fourth bone member body portion 1B-4 cause the third elastic hinge portion 1A-3 to be flexed so as to be positioned inward.

The bone member 1, the laminated-type pneumatic tube formation member 2, and the planar-type joint-portion flexural deformation member 3, which are constituent elements, are bonded and joined together into a hermetic state, by which the laminated-type multi-joint portion drive mechanism of the first embodiment is fabricated.

Figure 9:
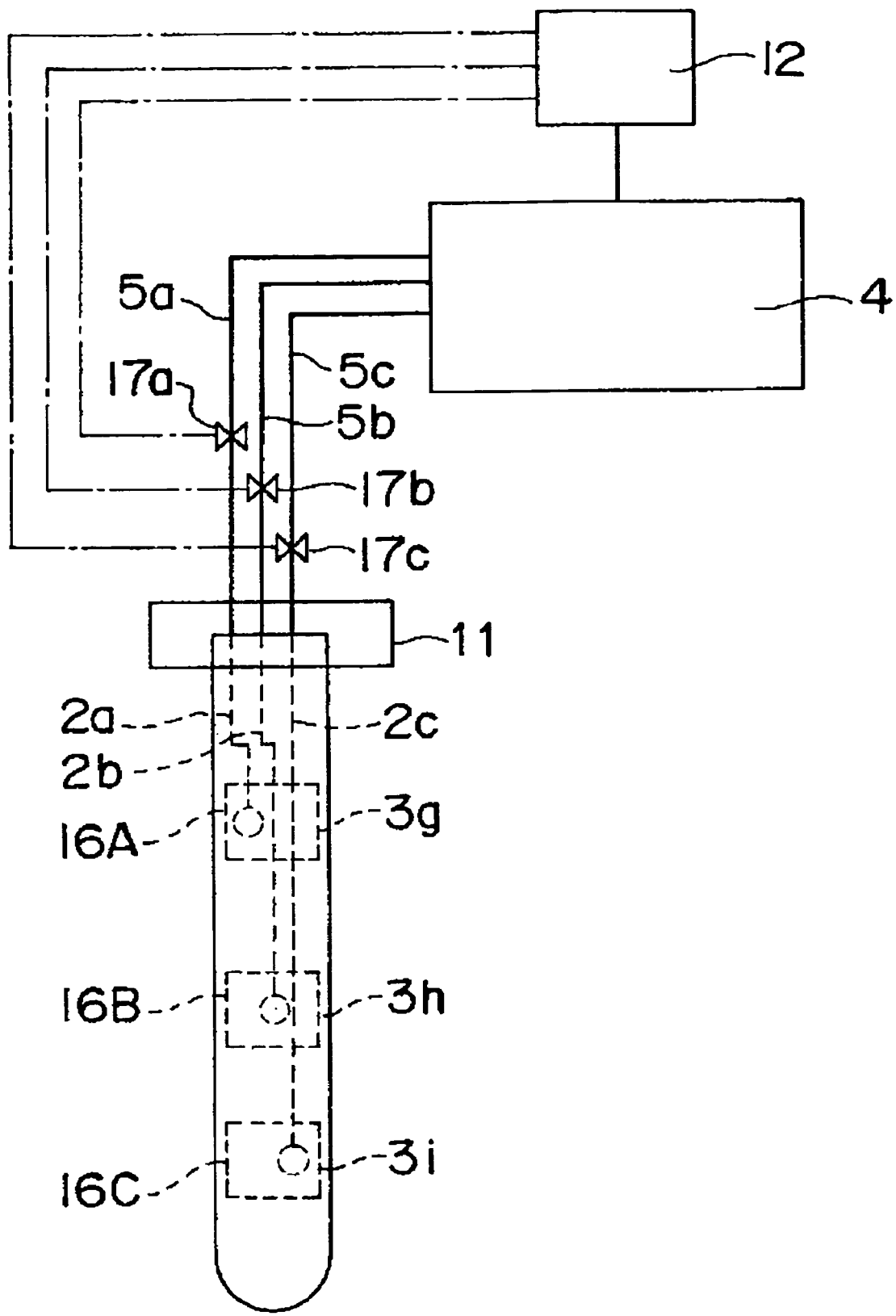
FIG. 9 is a block diagram for explaining a control operation of the laminated-type multi-joint portion drive mechanism according to the first embodiment.

A further description is given below for a case where the laminated-type multi-joint portion drive mechanism of the above construction is controlled for its drive by a control section 12. As shown in FIG. 9, the laminated-type multi-joint portion drive mechanism is placed and fixed to a fixing portion 11 with a root of the bone member 1 serving as a junction portion. The control section 12 controls drive of the pneumatic drive source 4, and also controls opening and closing of a first solenoid valve 17a interposed in the first laminated-type pneumatic tube 2a, opening and closing of a second solenoid valve 17b interposed in the second laminated-type pneumatic tube 2b, and opening and closing of a third solenoid valve 17c interposed in the third laminated-type pneumatic tube 2c. Further, the first pneumatic operation chamber 16A for driving the first joint portion 3a is provided by the first pneumatic operation hole 3g, wherein with air supplied to the first pneumatic operation chamber 16A, the first joint portion 3a is flexed about the first elastic hinge portion 1A-1 by guidance of the first bone member body portion 1B-1 and the second bone member body portion 1B-2 provided on both sides of the first elastic hinge portion 1A-1 as shown in FIG. 8. Also, the second pneumatic operation chamber 16B for driving the second joint portion 3b is provided by the second pneumatic operation hole 3h, wherein with air supplied to the second pneumatic operation chamber 16B, the second joint portion 3b is flexed about the second elastic hinge portion 1A-2 by guidance of the second bone member body portion 1B-2 and the third bone member body portion 1B-3 provided on both sides of the second elastic hinge portion 1A-2 as shown in FIG. 8. Also, the third pneumatic operation chamber 16C for driving the third joint portion 3c is provided by the third pneumatic operation hole 3i, wherein with air supplied to the third pneumatic operation chamber 16C, the third joint portion 3c is flexed about the third elastic hinge portion 1A-3 by guidance of the third bone member body portion 1B-3 and the fourth bone member body portion 1B-4 provided on both sides of the third elastic hinge portion 1A-3 as shown in FIG. 8.

Referring to operation of the multi-joint portion drive mechanism, first, the control section 12 acts to generate a signal for applying pneumatic pressure to the first pneumatic operation chamber 16A located at the first joint portion of the planar-type joint-portion flexural deformation member 3 of the multi-joint portion drive mechanism, and the pneumatic drive source 4 is driven and the first solenoid valve 17a is opened by the control section 12. As a result of this, air is supplied from the pneumatic drive source 4 to the first pneumatic operation hole 3g, i.e. the first pneumatic operation chamber 16A, via the first laminated-type pneumatic tube 2a, the first circular gas supply hole 2d, and the first circular gas supply hole 3d, so that air pressure, i.e., pneumatic pressure is applied to the first pneumatic operation chamber 16A. Along with this application of pneumatic pressure, the first pneumatic operation chamber 16A is expanded, causing the first joint portion to be flexed. To undo flexure of the first joint portion, drive of the pneumatic drive source 4 by the control section 12 is halted and the first solenoid valve 17a is opened, by which expansion at the first pneumatic operation chamber 16A due to pneumatic pressure is released, so that the first joint portion is returned to a stretched state. Also, independent of flexure of the first joint portion, the control section 12 acts to generate a signal for applying pneumatic pressure to the second pneumatic operation chamber 16B located at the second joint portion of the planar-type joint-portion flexural deformation member 3 of the multi-joint portion drive mechanism, and the pneumatic drive source 4 is driven and the second solenoid valve 17b is opened by the control section 12. As a result of this, air is supplied from the pneumatic drive source 4 to the second pneumatic operation hole 3h, i.e. the second pneumatic operation chamber 16B, via the second laminated-type pneumatic tube 2b, the second circular gas supply hole 2e, and the second circular gas supply hole 3e, so that air pressure, i.e., pneumatic pressure is applied to the second pneumatic operation chamber 16B. Along with this application of pneumatic pressure, the second pneumatic operation chamber 16B is expanded, thereby causing the second joint portion to be flexed. To undo flexure of the second joint portion, drive of the pneumatic drive source 4 by the control section 12 is halted and the second solenoid valve 17b is opened, by which expansion at the second pneumatic operation chamber 16B due to pneumatic pressure is released, so that the second joint portion is returned to a stretched state. Further, independent of flexure of the second joint portion, the control section 12 acts to generate a signal for applying pneumatic pressure to the third pneumatic operation chamber 16C located at the third joint portion of the planar-type joint-portion flexural deformation member 3 of the multi-joint portion drive mechanism, and the pneumatic drive source 4 is driven and the third solenoid valve 17c is opened by the control section 12. As a result of this, air is supplied from the pneumatic drive source 4 to the third pneumatic operation hole 3*i*, i.e. the third pneumatic operation chamber 16C, via the third laminated-type pneumatic tube 2*c*, the third circular gas supply hole 2*f*, and the third circular gas supply hole 3*f*, so that air pressure, i.e., pneumatic pressure is applied to the third pneumatic operation chamber 16C. Along with this application of pneumatic pressure, the third pneumatic operation chamber 16C is expanded, thereby causing the third joint portion to be flexed. To undo flexure of the third joint portion, drive of the pneumatic drive source 4 by the control section 12 is halted and the third solenoid valve 17*c* is opened, by which expansion at the third pneumatic operation chamber 16C due to pneumatic pressure is released, so that the third joint portion is returned to a stretched state.

According to the first embodiment, any arbitrary joint portion can be flexed securely by opening-and-closing control of the solenoid valves 17*a*, 17*b*, 17*c* by the control section 12.

Second Embodiment

Figure 11:
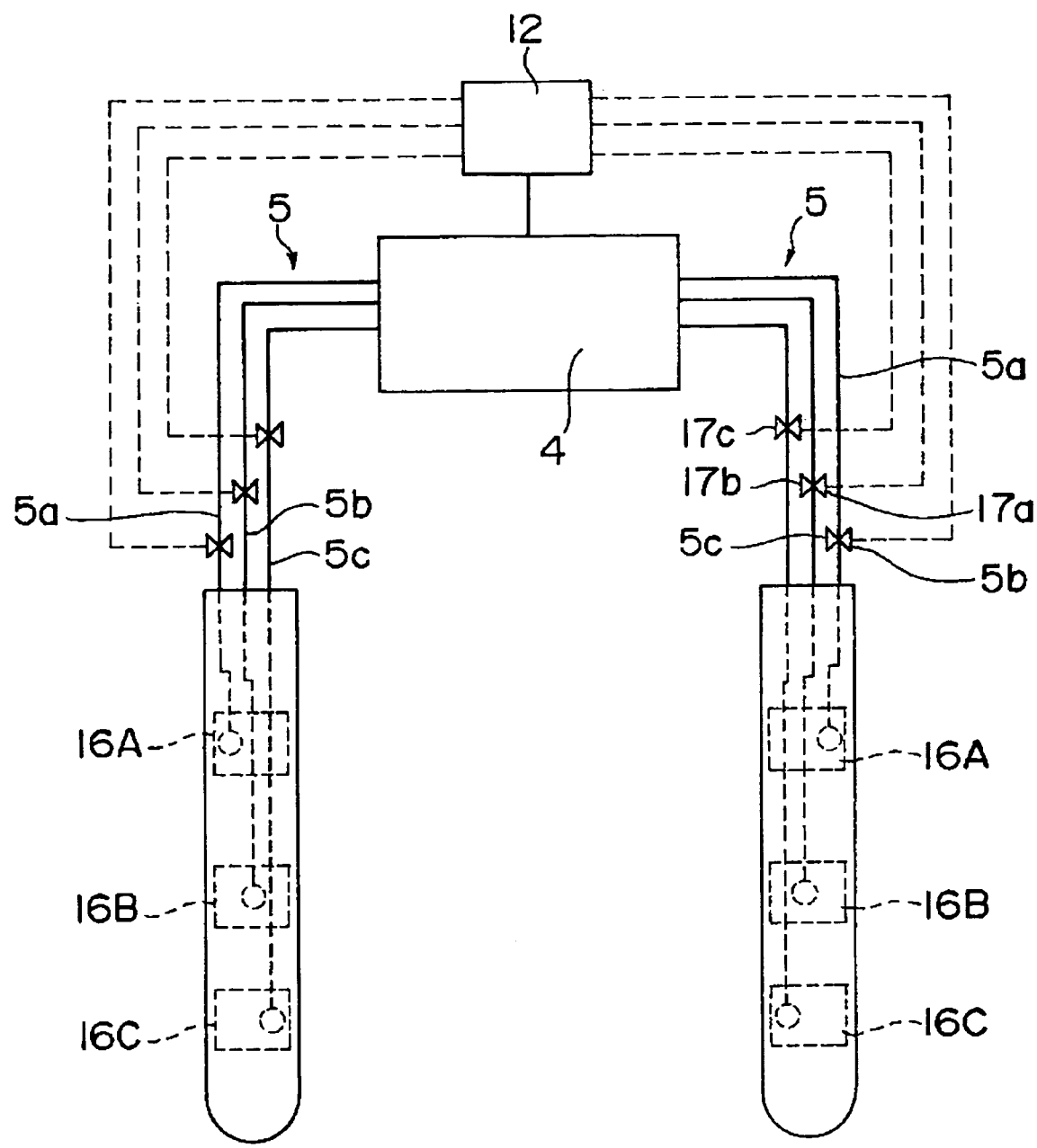
FIG. 11 is a block diagram for explaining a control operation of the grasping hand of FIG. 10.

FIGS. 10 and 11 are a perspective view and a block diagram, respectively, of a grasping hand provided with the laminated-type multi-joint portion drive mechanism of the first embodiment, where a grasping function is given by providing a plurality, e.g., one pair of laminated-type multi-joint portion drive mechanisms face to face and left-and-right symmetrical. With a root of each bone member 1 serving as a junction portion, the laminated-type multi-joint portion drive mechanisms are placed and fixed at a fixing portion 11 so as to confront each other.

The control section 12 controls drive of the pneumatic drive source 4, and also controls opening and closing of first solenoid valves 17*a*, 17*a* interposed on left-and-right first laminated-type pneumatic tubes 2*a*, 2*a*, opening and closing of second solenoid valves 17*b*, 17*b* interposed on left-and-right second laminated-type pneumatic tubes 2*b*, 2*b*, and opening and closing of third solenoid valves 17*c*, 17*c* interposed on left-and-right third laminated-type pneumatic tubes 2*c*, 2*c*, respectively and independently. Further, first pneumatic operation chambers 16A for driving the left-and-right first joint portions 3*a*, respectively, are provided by first pneumatic operation holes 3*g*, where with air supplied to the first pneumatic operation chambers 16A, each first joint portion 3*a* is flexed about first elastic hinge portion 1A-1 by guidance of the first bone member body portion 1B-1 and second bone member body portion 1B-2 provided on both sides of the first elastic hinge portion 1A-1 as shown in FIG. 8. Also, second pneumatic operation chambers 16B for driving left-and-right second joint portions 3*b* are provided by second pneumatic operation holes 3*h*, wherein with air supplied to the second pneumatic operation chambers 16B, each second joint portion 3*b* is flexed about its second elastic hinge portion 1A-2 by guidance of the second bone member body portion 1B-2 and the third bone member body portion 1B-3 provided on both sides of the second elastic hinge portion 1A-2 as shown in FIG. 8. Also, third pneumatic operation chambers 16C for driving left-and-right third joint portions 3*c* are provided by third pneumatic operation holes 3*i*, where with air supplied to the third pneumatic operation chambers 16C, each third joint portion 3*c* is flexed about its third elastic hinge portion 1A-3 by guidance of the third bone member body portion 1B-3 and the fourth bone member body portion 1B-4 provided on both sides of the third elastic hinge portion 1A-3 as shown in FIG. 8.

Referring to operation of the multi-joint portion drive mechanism, first, control section 12 acts to generate signals for applying pneumatic pressure, for example synchronously, to the first pneumatic operation chambers 16A, 16A located at left-and-right first joint portions of planar-type joint-portion flexural deformation members 3, 3 of the left-and-right multi-joint portion drive mechanisms, and, by the control section 12, the pneumatic drive source 4 is driven and left-and-right first solenoid valves 17*a*, 17*a* are synchronously opened. As a result of this, air is supplied from the pneumatic drive source 4 to left-and-right first pneumatic operation holes 3*g*, 3*g*, i.e. left-and-right first pneumatic operation chambers 16A, 16A, via left-and-right first laminated-type pneumatic tubes 2*a*, 2*a*, left-and-right first circular gas supply holes 2*d*, 2*d*, and left-and-right first circular gas supply holes 3*d*, 3*d*, respectively and synchronously, so that air pressure, i.e., pneumatic pressure is applied to the left-and-right first pneumatic operation chambers 16A, 16A, respectively and synchronously. Along with this left-and-right synchronized application of pneumatic pressure, the left-and-right first pneumatic operation chambers 16A, 16A are expanded respectively and synchronously, causing the left-and-right first joint portions to be flexed synchronously. To undo flexure of the left-and-right first joint portions, drive of the pneumatic drive source 4 by the control section 12 is halted and the first solenoid valves 17*a*, 17*a* are opened, by which expansion at the first pneumatic operation chambers 16A, 16A due to pneumatic pressure is released, so that the left-and-right first joint portions are returned to a stretched state. Also, independent of flexure of the left-and-right first joint portions, the control section 12 acts to generate signals for applying pneumatic pressure, for example synchronously, to second pneumatic operation chambers 16B, 16B located at left-and-right second joint portions of the planar-type joint-portion flexural deformation members 3, 3 of left-and-right multi-joint portion drive mechanisms, and, by the control section 12, the pneumatic drive source 4 is driven and left-and-right second solenoid valves 17*b*, 17*b* are synchronously opened. As a result of this, air is supplied from the pneumatic drive source 4 to left-and-right second pneumatic operation holes 3*h*, 3*h*, i.e. the left-and-right second pneumatic operation chambers 16B, 16B, via left-and-right second laminated-type pneumatic tubes 2*b*, 2*b*, left-and-right second circular gas supply holes 2*e*, 2*e*, and left-and-right second circular gas supply holes 3*e*, 3*e*, respectively and synchronously, so that air pressure, i.e., pneumatic pressure is applied to the left-and-right second pneumatic operation chambers 16B, 16B synchronously. Along with this left-and-right synchronized application of pneumatic pressure, the left-and-right second pneumatic operation chambers 16B, 16B are expanded synchronously, causing the left-and-right second joint portions to be flexed synchronously. To undo flexure of the left-and-right second joint portions, the drive of the pneumatic drive source 4 by the control section 12 is halted and the second solenoid valves 17*b*, 17*b* are opened, by which expansion at the second pneumatic operation chambers 16B, 16B due to pneumatic pressure is released, so that the left-and-right second joint portions are returned to a stretched state. Further, independent of flexure of the left-and-right second joint portions, the control section 12 acts to generate signals for applying pneumatic pressure, for example synchronously, to third pneumatic operation chambers 16C, 16C located at left-and-right third joint portions of the planar-type joint-portion flexural deformation members 3, 3 of the left-and-right multi-joint portion drive mechanisms, and, by the control section 12, the pneumatic drive source 4 is driven and left-and-right third solenoid valves 17*c*, 17*c* are synchronously opened. As a result of this, air is supplied from the pneumatic drive source 4 to left-and-right third pneumatic operation holes 3*i*, 3*i*, i.e. left-and-right third pneumatic operation chambers 16C, 16C, via left-and-right third laminated-type pneumatic tubes 2*c*, 2*c*, left-and-right third circular gas supply holes 2*f*, 2*f*, and left-and-right third circular gas supply holes 3*f*, 3*f*, respectively and synchronously, so that air pressure, i.e., pneumatic pressure is applied to the left-and-right third pneumatic operation chambers 16C, 16C synchronously. Along with this left-and-right synchronized application of pneumatic pressure, the left-and-right third pneumatic operation chambers 16C, 16C are expanded synchronously, thereby causing the left-and-right third joint portions to be flexed. To undo flexure of the left-and-right third joint portions, drive of the pneumatic drive source 4 by the control section 12 is halted and the third solenoid valves 17*c*, 17*c* are opened, by which expansion at the third pneumatic operation chambers 16C, 16C due to pneumatic pressure is released, so that the left-and-right third joint portions are returned to a stretched state.

According to the second embodiment, a grasping operation can be performed by reliably flexing arbitrary left-and-right joint portions by virtue of opening-and-closing control of the left-and-right solenoid valves 17*a*, 17*b*, 17*c* by the control section 12.

Figure 12:
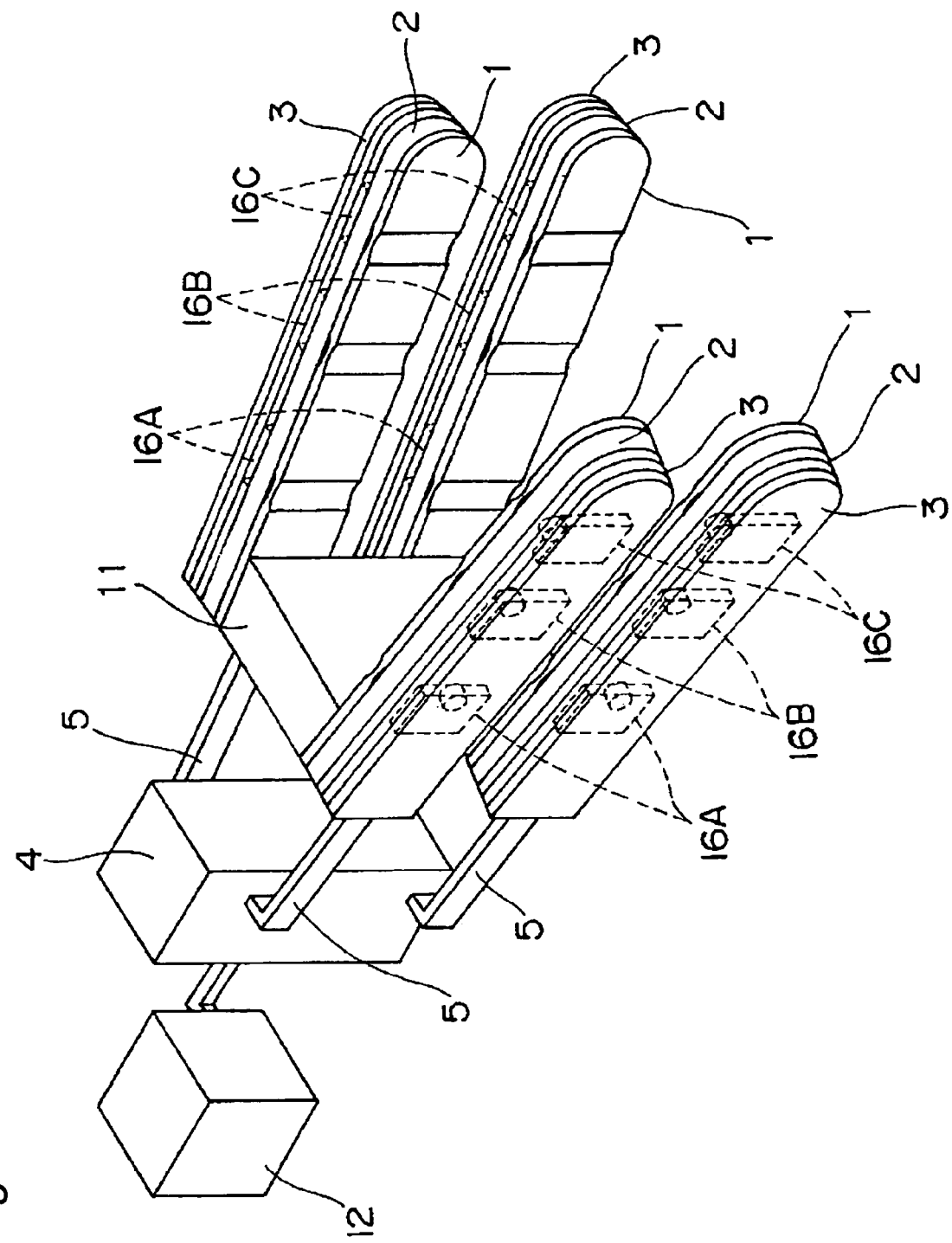
FIG. 12 is a perspective view of a model in a case where a constrained layer of each planar-type joint-portion flexural deformation member of a grasping hand provided with two pairs of planar-type joint-portion flexural deformation members according to a modification of the second embodiment of the present invention is restricted to a particular direction for its direction of expansion and contraction and where a bone member having an elastic hinge at each joint portion is provided.
Figure 13:
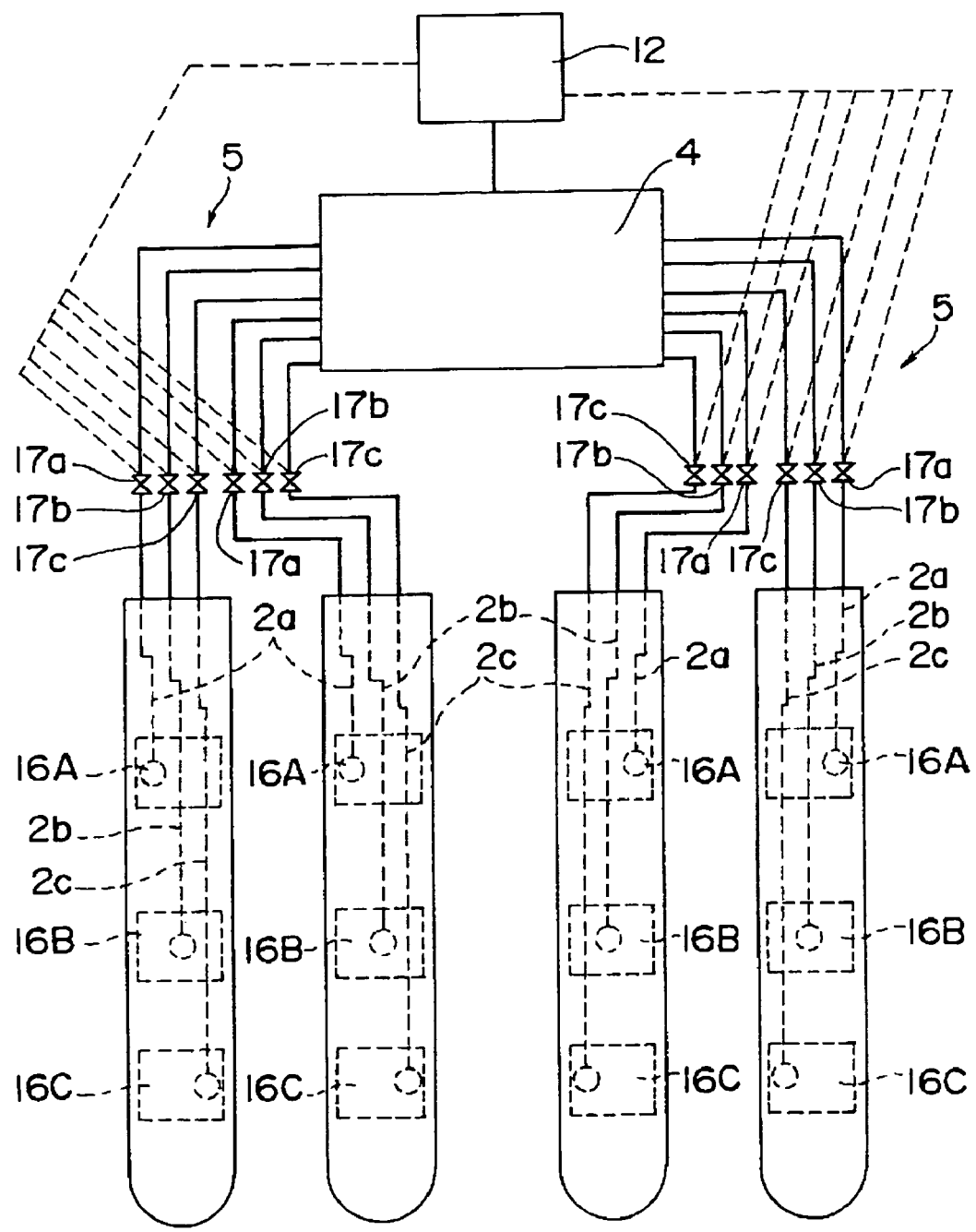
FIG. 13 is a block diagram for explaining a control operation of the grasping hand of FIG. 12.

As a modification of the second embodiment, FIGS. 12 and 13 are a perspective view and a block diagram, respectively, of a grasping hand provided with the laminated-type multi-joint portion drive mechanism of the first embodiment, where a grasping function is given by providing two pairs of laminated-type multi-joint portion drive mechanisms face to face and left-and-right symmetrical. With a root of each bone member 1 serving as a junction portion, the laminated-type multi-joint portion drive mechanisms are placed and fixed at fixing portion 11 so as to confront each other. Operation of each laminated-type multi-joint portion drive mechanism is the same as in the foregoing second embodiment of FIG. 10 and therefore its description is omitted.

Figure 14:
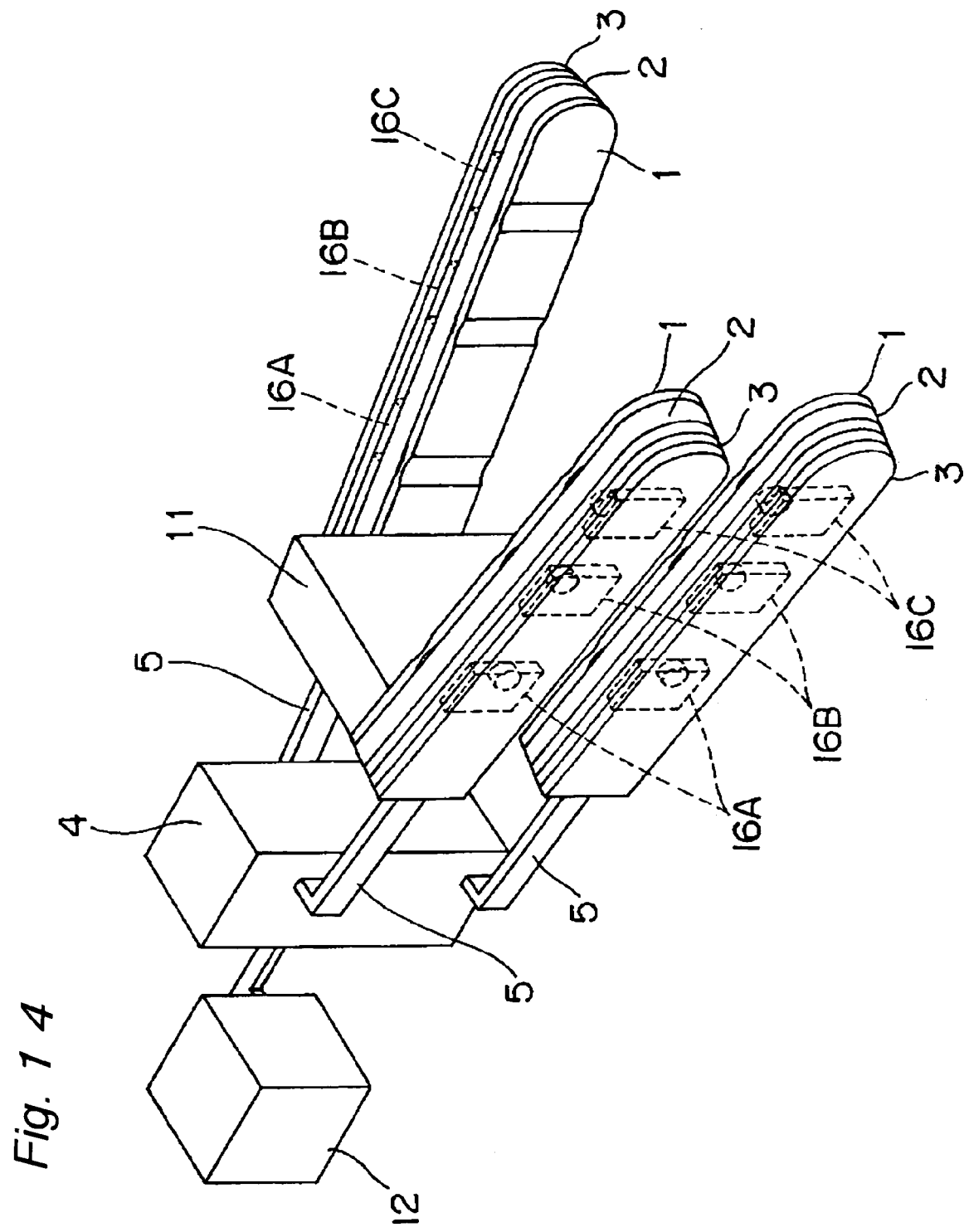
FIG. 14 is a perspective view of a model of a grasping hand in which laminated-type multi-joint portion drive mechanisms are provided left-and-right asymmetrically according to another modification of the second embodiment of the present invention.

Although an even number, e.g. two, of the laminated-type multi-joint portion drive mechanisms are arranged left-and-right symmetrically in FIGS. 12 and 13, yet it is also possible that two left-hand laminated-type multi-joint portion drive mechanisms and one right-hand laminated-type multi-joint portion drive mechanism are provided left-and-right asymmetrically as shown in a perspective view of FIG. 14, as another modification of the second embodiment of the present invention, depending on a configuration of objects to be grasped. Operation of each laminated-type multi-joint portion drive mechanism is the same as in the foregoing second embodiment of FIG. 10 and therefore its description is omitted.

Moreover, the laminated-type multi-joint portion drive mechanisms to be provided in a plurality may also be set with their length and width changed in response to their working objects.

Figure 15:
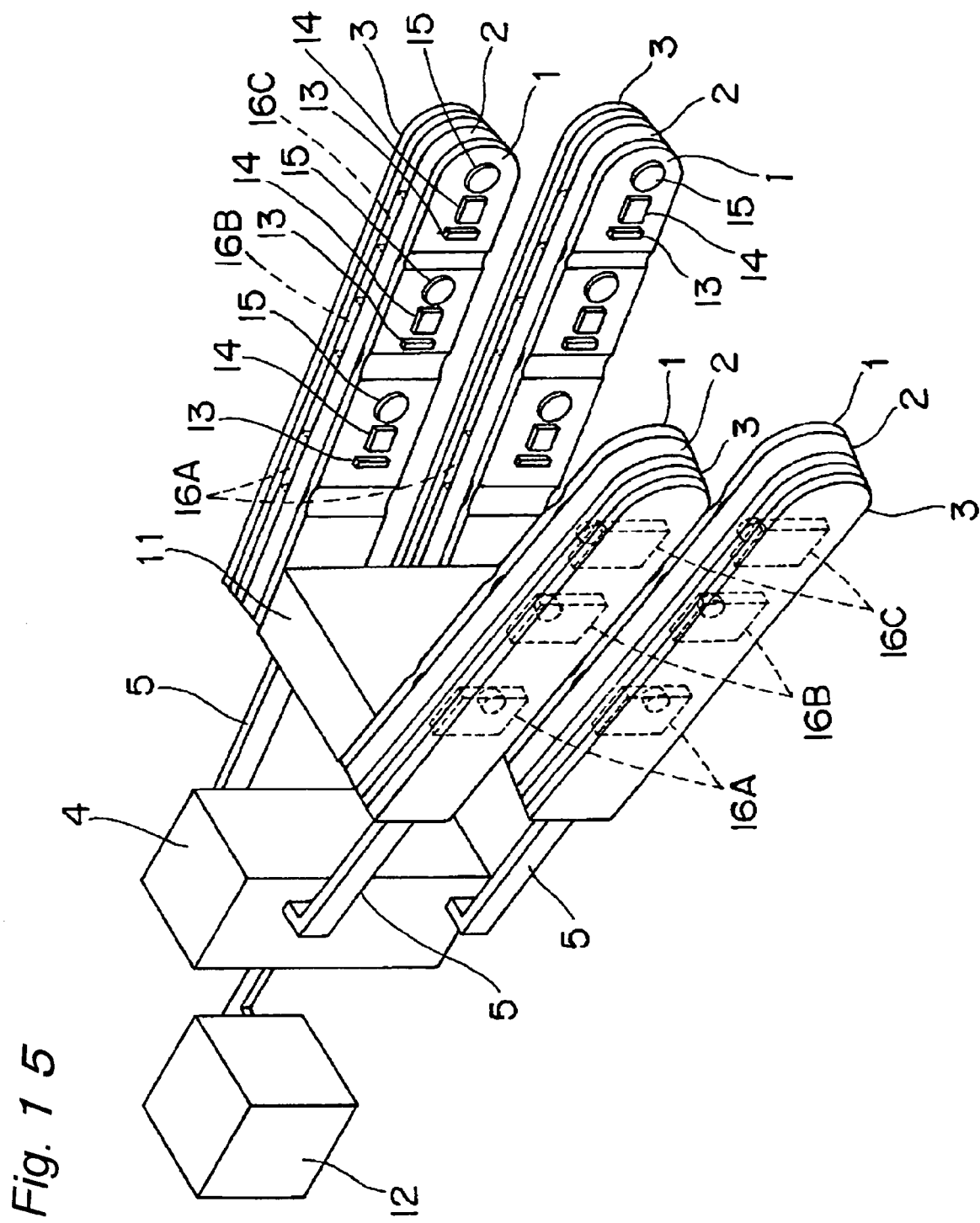
FIG. 15 is a perspective view of a grasping hand in which a laminated-type multi-joint portion drive mechanism having a sensor on a grasping surface side according to yet another modification of the second embodiment of the present invention is provided.
Figure 16:
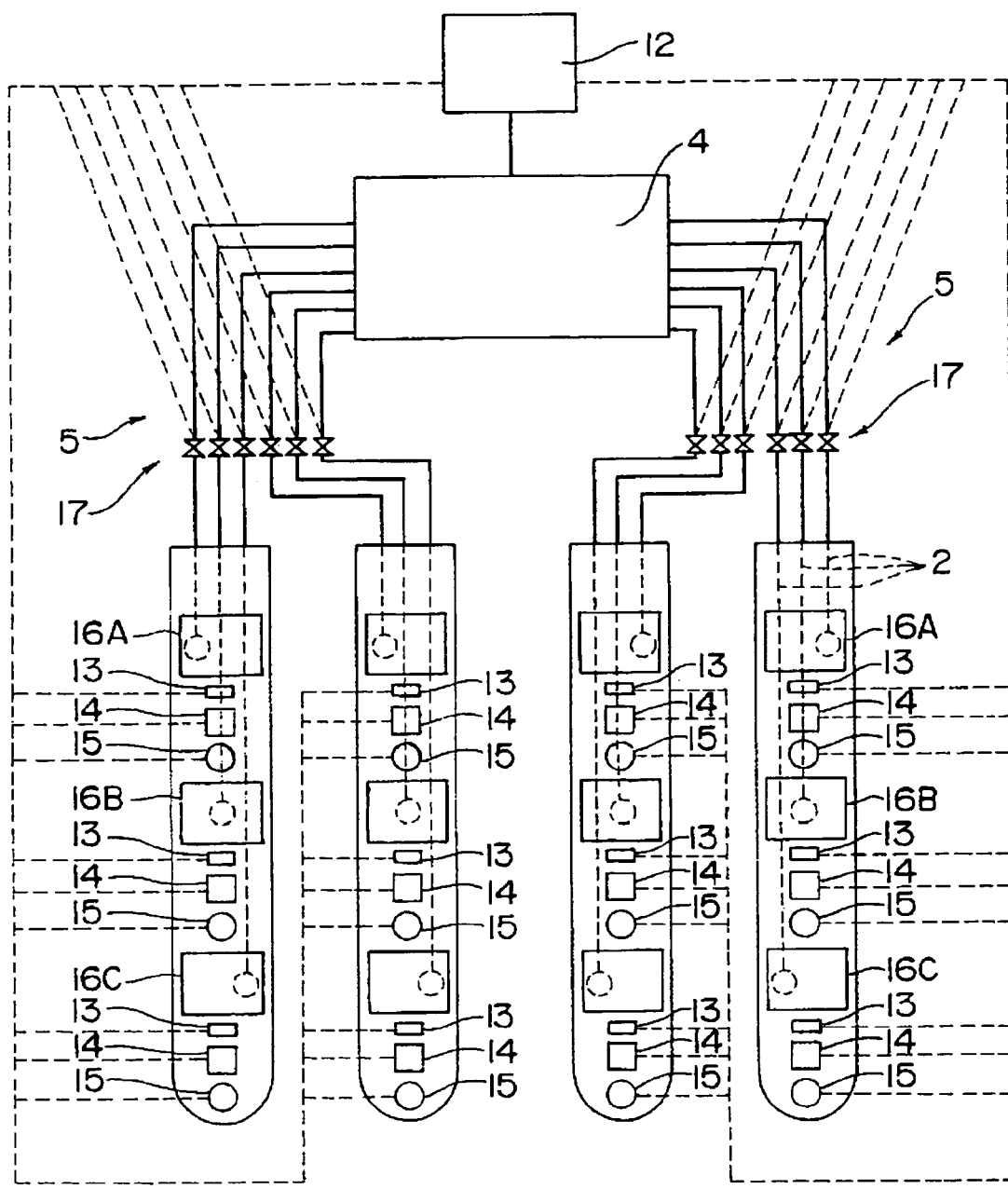
FIG. 16 is a block diagram showing a grasping operation of the grasping hand of FIG. 15.

As yet another modification of the second embodiment of the present invention, as shown in a perspective view and a block diagram of FIGS. 15 and 16, four laminated-type multi-joint portion drive mechanisms are set left-and-right symmetrically, i.e. two on each of left and right sides, so that their base end portions are fixed to fixing portion 11, and pneumatic drive sources 4 are connected to the laminated-type multi-joint portion drive mechanisms via their respective pneumatic pressure introduction tubes 5, respectively, and these four pneumatic drive sources 4, . . . , 4 are controlled for their drive by the control section 12. Further, on a grasping surface side of each bone member 1 are placed a contact sensor 13 which is connected to control section 12 to detect contact with an object, a pressure-sensitive sensor 14 which is connected to the control section 12 to detect a pressure upon contact with the object, a friction sensor 15 which is connected to the control section 12 to detect a frictional force upon contact with the object, or the like. Then, grasping information as to an object detected by each of the sensors 13, 14, 15, respectively, is fed back to the control section 12, and the four pneumatic drive sources 4, . . . , 4 are controlled independently of one another by the control section 12 to control pneumatic pressure supplied to their respective pneumatic operation chambers so that a flexural operation of their respective joint portions are controlled. Thus, it becomes possible to perform a grasping operation more effectively. Further, by covering at least part of a grasping surface of each bone member 1 with a flexible material having a large frictional resistance, it becomes possible to improve grasping power.

As shown above, according to the foregoing embodiments, the grasping hand is light in weight and small in size by virtue of use of the above-described laminated-type multi-joint portion drive mechanism, and moreover high in compliance by virtue of use of a driving source with pneumatic pressure used as the pneumatic drive source 4 for expansion of an elastic member, so that the grasping hand can be maintained sufficiently safe in event of contact and collisions with persons by virtue of the above characteristics. Further, since electrical connections are not needed except for sensor portions, there is an advantage in that only with waterproof treatment of the sensor portions, the grasping hand becomes usable even under working environments in which water is used.

Next, with reference to FIGS. 17 to 22, for example, a concrete grasping operation of a grasping hand according to still another modification of the second embodiment shown in FIGS. 15 and 16 is explained.

The operation of the grasping hand proceeds as follows, where a grasping operation of an object with individual bone members 1 used as grasping surfaces is performed by flexural operation.

Figure 17:
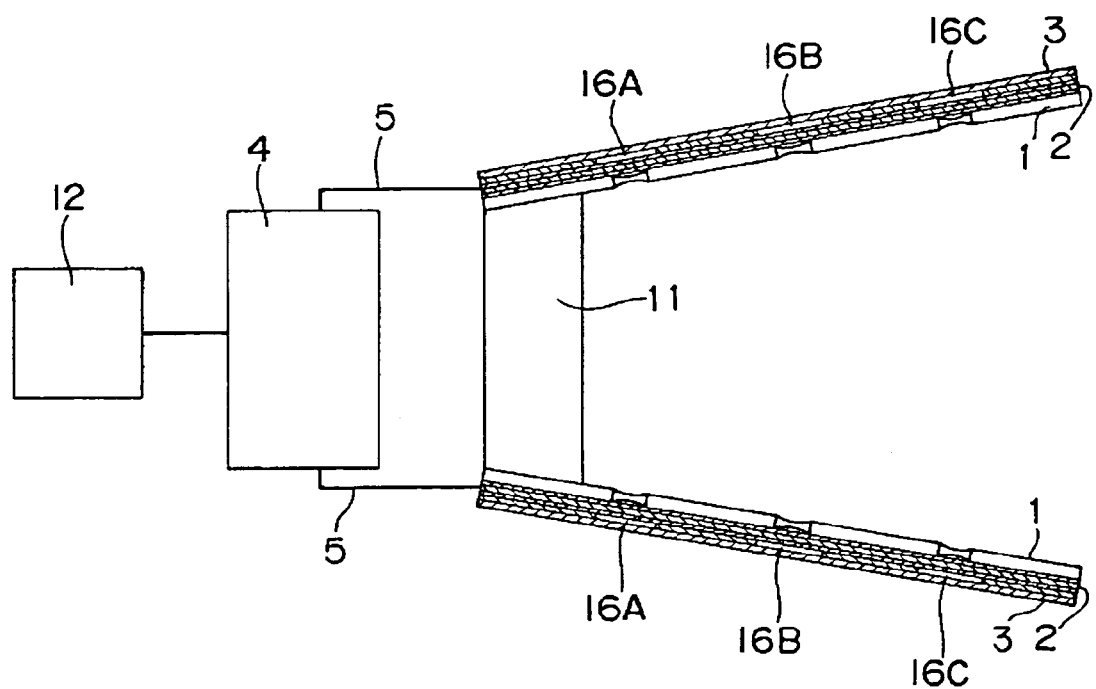
FIG. 17 is a plan view showing a neutral state of the grasping hand of FIG. 15.

First, in a neutral state of the grasping hand shown in FIG. 17, there are generated signals for applying pneumatic pressure from the control section 12 to the first pneumatic operation chamber 16A, the second pneumatic operation chamber 16B, and the third pneumatic operation chamber 16C located at individual joint portions of the planar-type joint-portion flexural deformation member 3 of each multi-joint portion drive mechanism. By these signals, the four pneumatic drive sources 4, . . . , 4 are controlled for drive independently of one another to perform opening and closing of solenoid valves 17 provided halfway in their respective pneumatic pressure introduction tubes 5, so that pneumatic pressure is applied from the pneumatic drive sources 4 to the first pneumatic operation chamber 16A, the second pneumatic operation chamber 16B, and the third pneumatic operation chamber 16C through their respective pneumatic pressure introduction tubes 5 and laminated-type pneumatic tube formation members 2, synchronously or successively. Along with application of pneumatic pressure, the first pneumatic operation chambers 16A, the second pneumatic operation chambers 16B, and the third pneumatic operation chambers 16C are expanded, respectively, so that the joint portions are flexed, respectively. As a result of this flexural operation, a grasping operation of an object 18 is performed with individual bone members 1 serving as grasping surfaces.

FIG. 17 is a plan view showing a state of the grasping hand in a neutral state that pneumatic pressure is not applied to these multi-joint portion drive mechanisms (a state that the multi-joint portion drive mechanisms are straightly stretched). These laminated-type multi-joint portion drive mechanisms have a function that when pneumatic pressure is applied from their pneumatic drive sources 4 to their pneumatic operation chambers under control by the control section 12, those multi-joint portion drive mechanisms are displaced toward a grasping direction, i.e. mutually approaching direction, and that when drive of their respective pneumatic drive sources 4 is halted to stop pneumatic pressure application under control by the control section 12, the multi-joint portion drive mechanisms are restored to their original positions by elasticity of the elastic hinges 1A of the respective multi-joint portion drive mechanisms; thus, the grasping hand maintains a neutral state. In this neutral state, applying to the individual joint portions a pneumatic pressure corresponding to the grasping object under control by the control section 12 allows the grasping operation to be fulfilled.

Figure 18A:
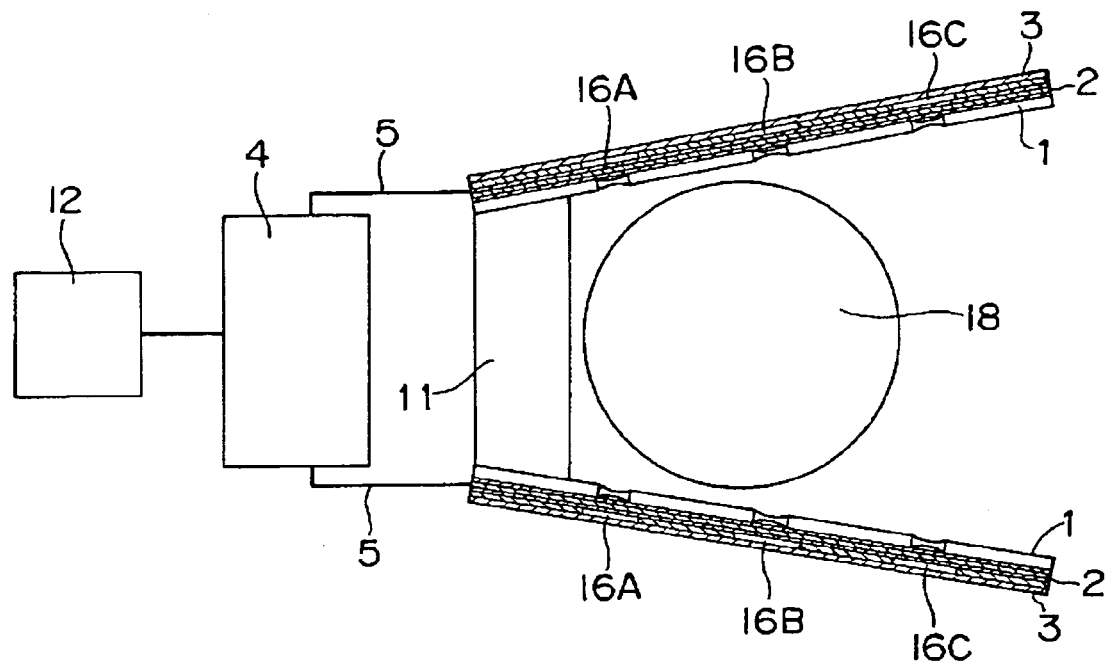
FIGS. 18A and 18B are a plan view showing a neutral state of the grasping hand of FIG. 15 before its grasping an object, and a plan view showing the grasping hand of FIG. 15 that is grasping an object, respectively.
Figure 18B:
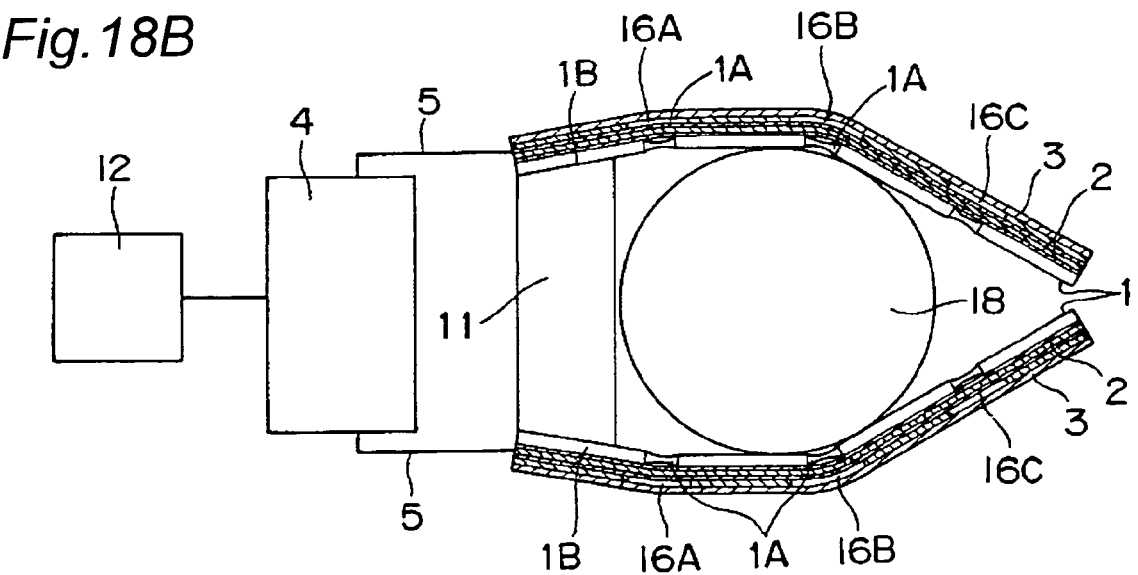

FIGS. 18A and 18B are plan views showing a model in a case where an object to be grasped is, for example, a cylindrical or columnar shaped object 18 whose size (diameter or width) is nearly equal to an opening distance of each multi-joint portion drive mechanism in a neutral state of the grasping hand. As shown in FIG. 18A, first, the grasping hand is moved by an unshown carrier vehicle or the like on which the grasping hand is placed until the object 18 comes close to a proximity to fixing portion 11. Thereafter, under control by control section 12, pneumatic pressure is applied from respective pneumatic drive sources 4 to the first pneumatic operation chambers 16A, which are the closer to the fixing portion 11, of the multi-joint portion drive mechanisms, respectively, as shown in FIG. 18B, so that the first joint portions are flexed inward, i.e., toward a grasping direction. At a point in time when respective grasping surfaces have come into contact with the object 18 (e.g., a point in time when contact sensors provided at the grasping surfaces of the individual multi-joint portion drive mechanisms have each inputted to the control section 12 signals representing contact with the object 18), pneumatic pressure is applied from the pneumatic drive sources 4 to the second pneumatic operation chambers 16B, respectively, under control by the control section 12, by which the respective second joint portions are flexed so that the object 18 is embraced by the four multi-joint portion drive mechanisms, whereby grasping is achieved. For releasing the grasping, as described above, drive of the respective pneumatic drive sources 4 is halted to stop pneumatic pressure application under control by the control section 12, so that the multi-joint portion drive mechanisms are restored to their original positions, not being flexed but being straightly stretched, by elasticity of the elastic hinges 1A of the respective multi-joint portion drive mechanisms, thus the grasping hand comes into a neutral state, i.e., a grasping-released state.

Figure 19A:
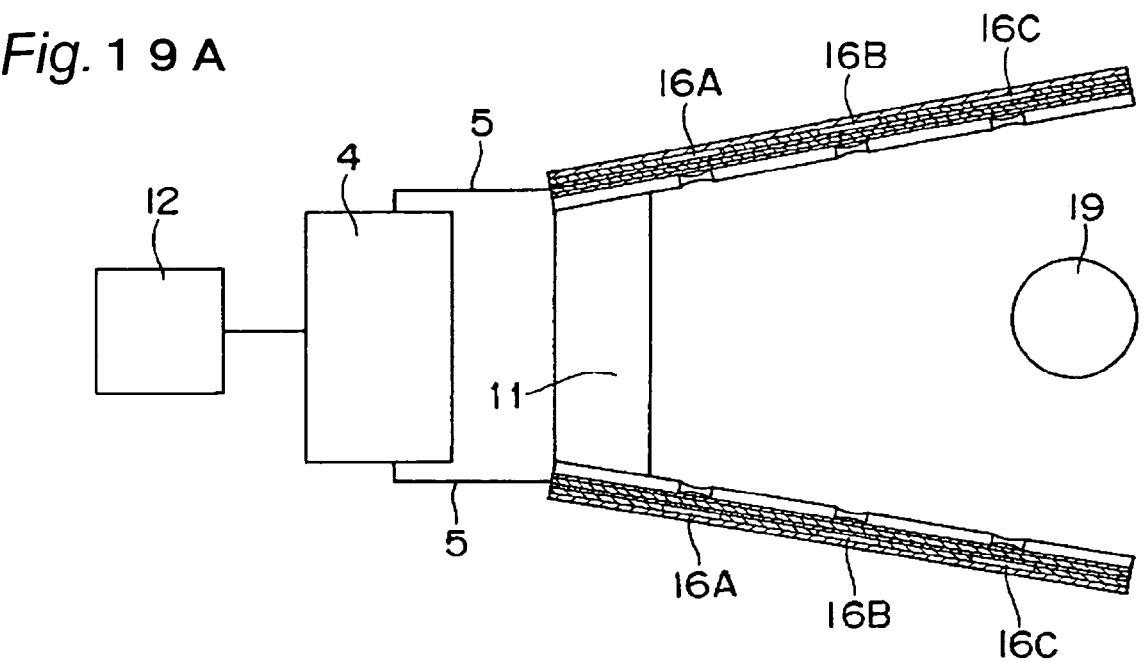
FIGS. 19A and 19B are a plan view showing a neutral state of the grasping hand of FIG. 15 before its grasping an object, and a plan view showing the grasping hand of FIG. 15 that is grasping an object, respectively.
Figure 19B:
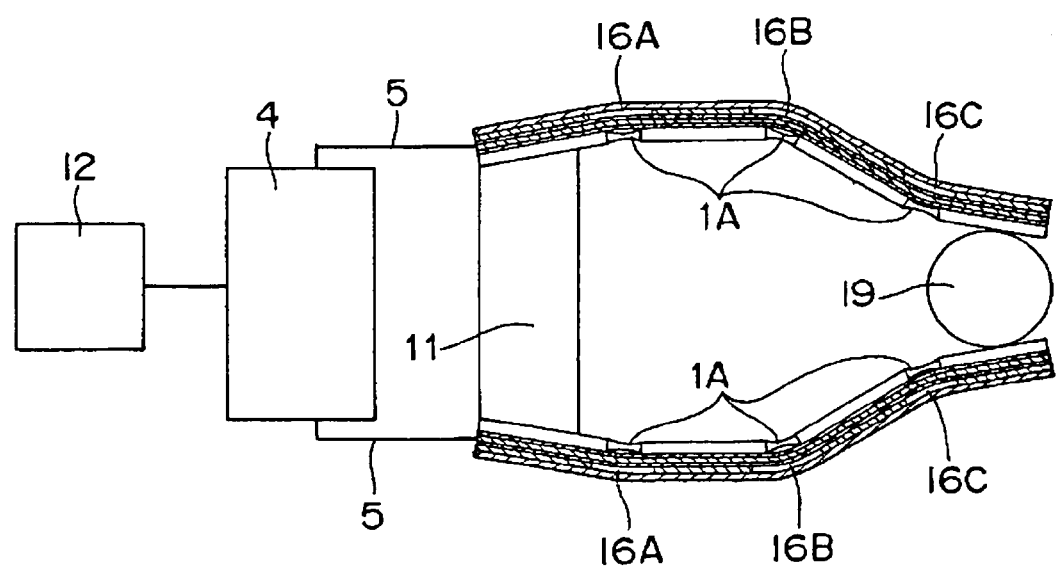

FIGS. 19A and 19B are plan views showing a model in a case where an object to be grasped is, for example, a cylindrical or columnar shaped object 19 whose diameter or width is smaller than an opening distance of each multi-joint portion drive mechanism in a neutral state of the grasping hand. As shown in FIG. 19A, first, the grasping hand is moved by an unshown carrier vehicle or the like with the grasping hand placed thereon until the object 19 comes close to an end portion of each multi-joint portion drive mechanism. Thereafter, under control by the control section 12, pneumatic pressure is applied from the respective pneumatic drive sources 4 to the first pneumatic operation chambers 16A, the second pneumatic operation chambers 16B, and the third pneumatic operation chambers 16C of the multi-joint portion drive mechanisms, successively in an order of increasing distance to the fixing portion 11, as shown in FIG. 19B, so that the joint portions are flexed inward, i.e., toward a grasping direction. At a point in time when respective grasping surfaces have come into contact with the object 19 (e.g., a point in time when contact sensors provided at the grasping surfaces of the respective multi-joint portion drive mechanisms have each inputted to the control section 12 signals representing contact with the object 19), pneumatic pressure is further applied from the pneumatic drive sources 4 to the second pneumatic operation chambers 16B, respectively, under control by the control section 12, by which respective second joint portions are flexed so that the object 19 is pinched by the four multi-joint portion drive mechanisms, whereby grasping is achieved. For releasing the grasping, as described above, drive of the respective pneumatic drive sources 4 is halted to stop pneumatic pressure application under the control by the control section 12, so that the multi-joint portion drive mechanisms are restored to their original positions, not being flexed but being straightly stretched, by elasticity of the elastic hinges 1A of the respective multi-joint portion drive mechanisms; thus, the grasping hand comes into a neutral state, i.e., a grasping-released state.

Figure 20A:
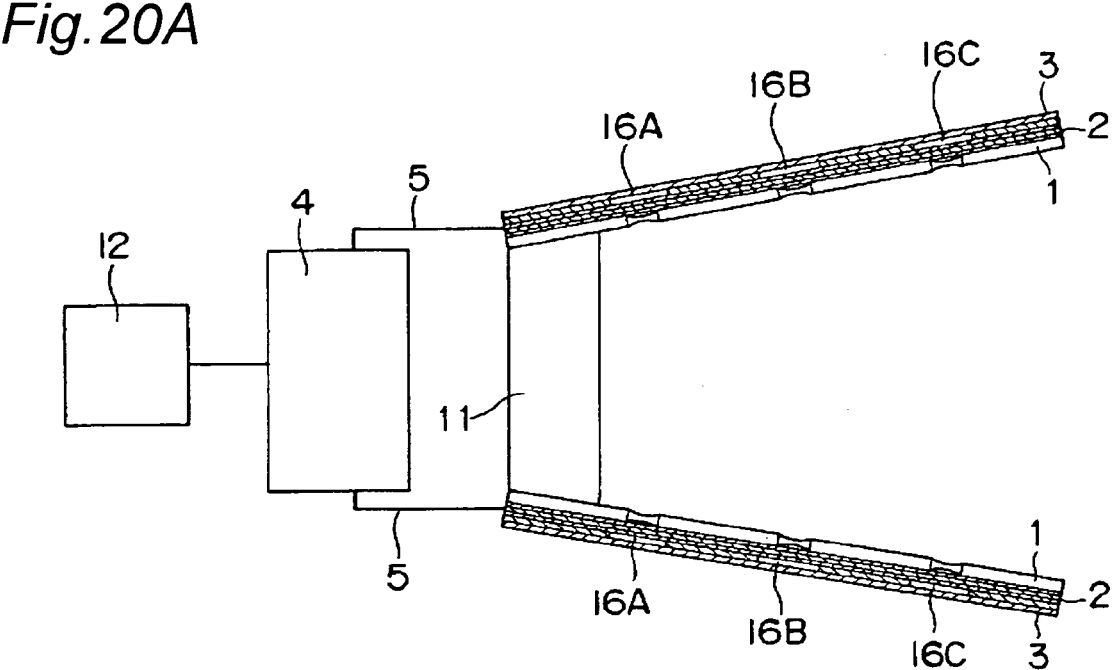
FIGS. 20A and 20B are a plan view showing a neutral state of the grasping hand of FIG. 15, and a plan view showing a state of the grasping hand of FIG. 15 that has broadened an opening distance more than in the neutral state, respectively.
Figure 20B:
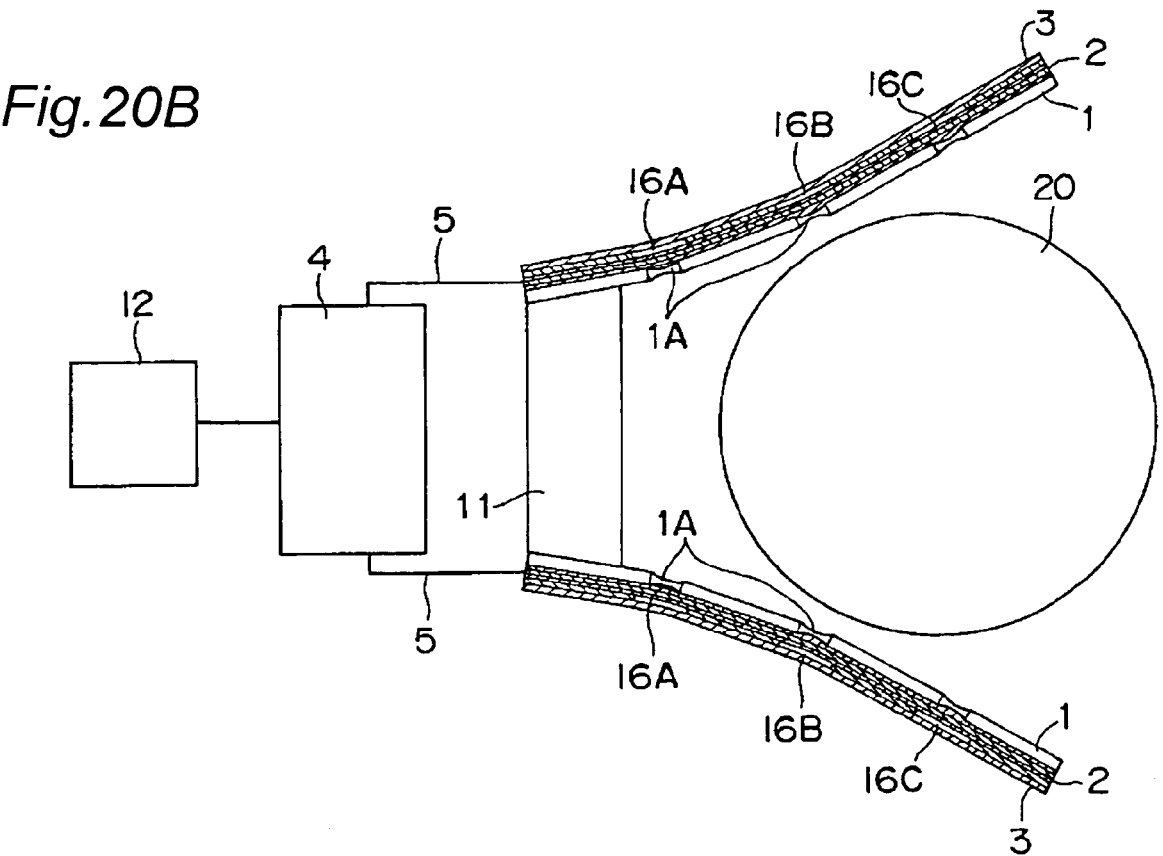
Figure 21:
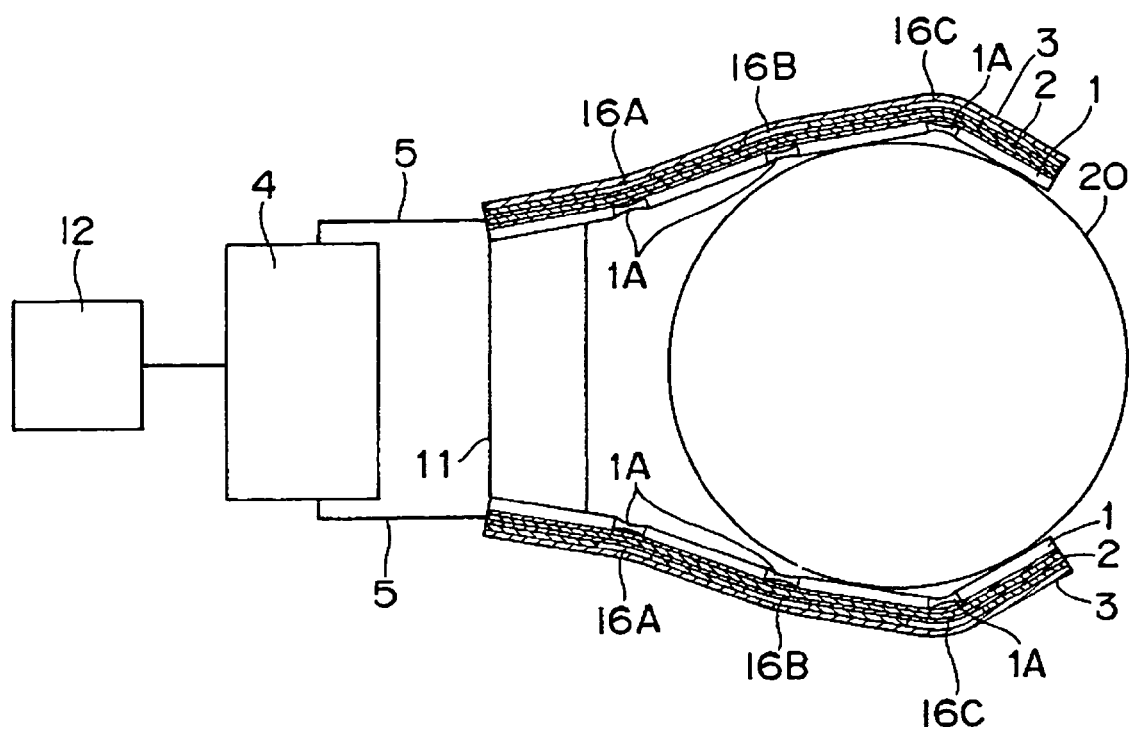
FIG. 21 is a plan view showing the grasping hand of FIG. 15 that is grasping an object in FIG. 20B.

FIGS. 20A, 20B, and 21 are plan views showing a model in a case where an object to be grasped is, for example, a cylindrical or columnar shaped object 20 whose diameter or width is larger than the opening distance of each multi-joint portion drive mechanism in a neutral state of the grasping hand. In this example, the pneumatic drive sources 4 connected to the respective laminated-type multi-joint portion drive mechanisms have a reverse drive (evacuative drive) controllability or forced evacuative function of pressure reducing pumps or the like in addition to the pneumatic pressure application function. By the respective pneumatic drive sources 4 being driven into evacuation under control by the control section 12, in a neutral state of FIG. 20A, air is forcedly discharged from the first pneumatic operation chambers 16A, the second pneumatic operation chambers 16B, and the third pneumatic operation chambers 16C of each laminated-type multi-joint portion drive mechanism as shown in FIG. 20B, by which each laminated-type multi-joint portion drive mechanism is broadened in its opening distance even more than that of the neutral state in which pneumatic pressure is not applied; thus, making it easier to put the object 20 into the grasping hand. Thereafter, the grasping hand is moved by an unshown carrier vehicle or the like with the grasping hand placed thereon until the object 20 comes close to an end portion of each multi-joint portion drive mechanism. Thereafter, under control by the control section 12, pneumatic pressure is applied from the respective pneumatic drive sources 4 to the first pneumatic operation chambers 16A, the second pneumatic operation chambers 16B, and the third pneumatic operation chambers 16C of the multi-joint portion drive mechanisms, successively in an order of increasing distance to the fixing portion 11, as shown in FIG. 21, so that the joint portions are flexed inward, i.e., toward a grasping direction. At a point in time when respective grasping surfaces have come into contact with the object 20 (e.g., a point in time when contact sensors provided at the grasping surfaces of the individual multi-joint portion drive mechanisms have each inputted to the control section 12 signals representing contact with the grasping object 20), pneumatic pressure is further applied from the pneumatic drive sources 4 to the third pneumatic operation chambers 16C, respectively, under control by the control section 12, by which the respective second joint portions are flexed so that the object 20 is pinched by the four multi-joint portion drive mechanisms, whereby grasping is achieved. For releasing the grasping, as described above, drive of the respective pneumatic drive sources 4 is halted to stop pneumatic pressure application under control by the control section 12, so that the multi-joint portion drive mechanisms are restored to their original positions, not being flexed but being straightly stretched, by elasticity of the elastic hinges 1A of the respective multi-joint portion drive mechanisms, whereby the grasping hand comes into a neutral state, i.e., a grasping-released state. Further, for more reliable releasing of the grasping, by forcedly discharging air from the first pneumatic operation chambers 16A, the second pneumatic operation chambers 16B, and the third pneumatic operation chambers 16C of each laminated-type multi-joint portion drive mechanism, the laminated-type multi-joint portion drive mechanism is broadened in its opening distance even more than that of the neutral state in which pneumatic pressure is not applied; thus, making the object 20 more easily disengaged from the grasping hand.

As shown above, the grasping hand having at least one pair of multi-joint portion drive mechanisms has a characteristic of making it possible to grasp various and diverse objects.

Third Embodiment

Figure 22:
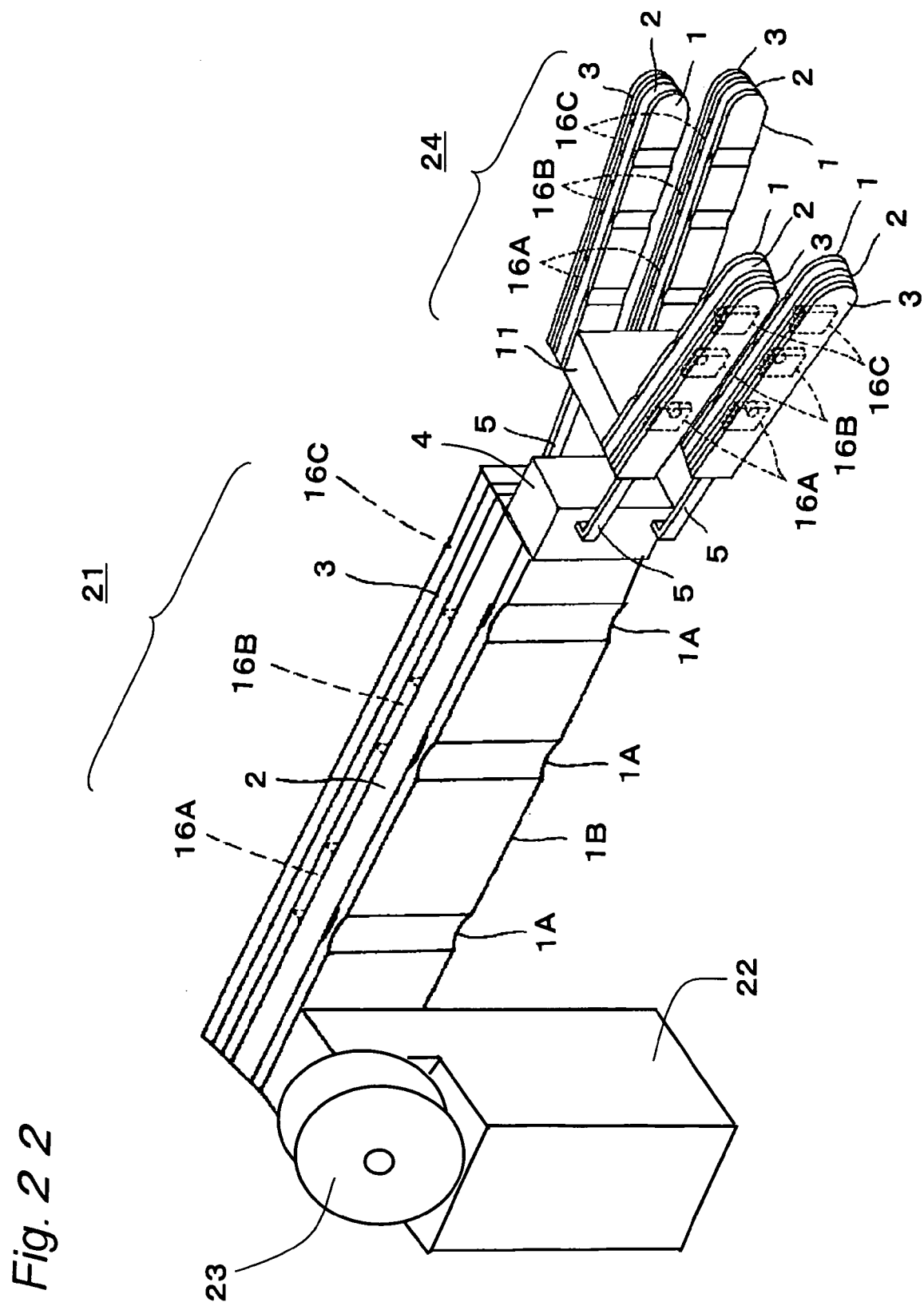
FIG. 22 is a perspective view of a robot which uses a laminated-type multi-joint portion drive mechanism according to a third embodiment of the present invention and in which the laminated-type multi-joint portion drive mechanism of FIG. 1 is provided with the grasping hand of FIG. 12 according to the second embodiment.

FIG. 22 is a perspective view of a robot which uses a laminated-type multi-joint portion drive mechanism according to a third embodiment of the present invention and in which the grasping hand of FIG. 12 according to the second embodiment is provided at an end of the robot arm of the laminated-type multi-joint portion drive mechanism of FIG. 1.

Robot arm 21 of FIG. 22 is constructed by using the laminated-type multi-joint portion drive mechanism shown in FIG. 1 according to the first embodiment, with its drive principle being as described in the first embodiment. The robot arm 21 is connected to a robot arm prop 22 having a pneumatic drive source via a rolling mechanism 23, and further a grasping hand 24 shown in FIG. 12 according to the second embodiment is connected to an end portion of the robot arm 21. By drive of the robot arm 21, the grasping hand 24 is positioned to an arbitrary position within a movable range to grasp an object. This robot arm 21, which uses the laminated-type multi-joint portion drive mechanism of the present invention, makes it possible to achieve a flexible positioning that ensures safety to persons who use the robot arm as described above.

Furthermore, in a case where the laminated-type multi-joint portion drive mechanism is applied to the robot arm 21, it is more desirable to set its laminated surfaces along a vertical direction as in the third embodiment of FIG. 22. With such a construction, since bone members 1 are high in in-plane rigidity, it becomes possible to support heavyweight objects with the bone members 1; thus, enabling the robot arm to treat heavyweight objects.

The third embodiment of FIG. 22 has been described above for a construction in which the robot arm 21 is connected to the robot arm prop 22 via the rolling mechanism 23. However, without being limited to this, the construction may be given in other ways, for example, one in which such a uniaxial or multiaxial rolling mechanism is provided at a root portion of the robot arm prop 22 or between the robot arm 21 and the grasping hand 24. In combinations with such a multiaxial rolling mechanism, it becomes possible to make the grasping hand more flexibly postured.

By properly combining arbitrary embodiments of the aforementioned various embodiments, effects possessed by the embodiments can be produced.

As described hereinabove, according to the present invention, the laminated-type multi-joint portion drive mechanism includes a bone member having at least two elastically-deformable elastic deformation portions, a laminated-type pneumatic tube member having at least twoline-tubes which are fixed so as to be laid on the bone member and which are connected to the pneumatic drive source, and a planar-type joint-portion deformation member which is fixed so as to be laid on the laminated-type pneumatic tube member and which has pneumatic operation chambers placed at joint portions confronting the elastic deformation portions of the bone member, respectively, and connected to the tubes, respectively, wherein with pneumatic pressure applied to the pneumatic operation chambers, the joint portion(s) corresponding to the pneumatic operation chamber(s) to which the pneumatic pressure is applied is deformable, and wherein with pneumatic pressure applied to the pneumatic operation chamber(s) corresponding to the joint portion(s) which need to be driven, the joint portions become deformable. With this constitution, there can be provided a laminated-type multi-joint portion drive mechanism which is capable of realizing a grasping hand having a grasping performance for grasping of various and diverse objects, and which is safe and simple in terms of structure, and moreover which can be realized with low cost.

The grasping hand in which this laminated-type multi-joint portion drive mechanism is arranged face to face can be realized with a simple structure and low cost as a grasping hand which has a grasping performance for grasping of various and diverse objects, and which is safe, and which has multi-joint portions.

Also, the laminated-type multi-joint portion drive mechanism can be manufactured simply and with low cost by integrally molding the bone member having elastic hinges at least the elastic deformation portions, and stacking and bonding the laminated-type pneumatic tube member and the planar-type joint-portion flexural deformation member together on the bone member in manufacture of the laminated-type multi-joint portion drive mechanism.

Further, when the bone member forming a part of the multi-joint portion drive mechanism has elastic hinges at its joint portions, the laminated-type multi-joint portion drive mechanism of the present invention is enabled to improve grasping rigidity by constraining a degree of freedom of the joint portions to one degree of freedom, so that the above working effects can be achieved more effectively.

Furthermore, the robot arm using the laminated-type multi-joint portion drive mechanism of the present invention, when provided with the grasping hand at its distal end, is enabled to fulfill a safe positioning of the grasping hand against an object located within its movable range.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. A laminated-type multi-joint portion drive mechanism comprising:
   a pneumatic drive source for providing pneumatic pressure;
   a bone member having at least two elastically-deformable elastic deformation portions;
   a laminated-type pneumatic tube member fixed on said bone member, said laminated-type pneumatic tube member having line-tubes separately connected to said pneumatic drive source; and
   a planar-type joint-portion flexural deformation member fixed on said laminated-type pneumatic tube member, said planar-type joint-portion flexural deformation member having joint portions and pneumatic operation chambers at said joint portions, separately and respectively, with said joint portions being aligned with said at least two elastic deformation portions, respectively, and said pneumatic operation chambers being separately connected to said line-tubes, respectively,
   such that when pneumatic pressure is applied to one of said pneumatic operation chambers, a corresponding one of said joint portions is deformed.

2. The laminated-type multi-joint portion drive mechanism according to claim 1, further comprising:
   a control section for causing pneumatic pressure to be independently applied to said pneumatic operation chambers via said line-tubes, respectively.

3. The laminated-type multi-joint portion drive mechanism according to claim 1, wherein
   said at least two elastic deformation portions comprise elastic hinge portions, respectively.

4. A grasping hand having two members facing one another, with each of the two members including a laminated-type multi-joint portion drive mechanism according to claim 3 such that the two members can cooperate with each other to grasp an object.

5. A robot arm having at an end thereof the grasping hand according to claim 4.

6. The laminated-type multi-joint portion drive mechanism according to claim 3, wherein
   said planar-type joint-portion flexural deformation member includes a constrained layer for imparting a directivity of expandability and contractibility to said planar-type joint-portion flexural deformation member along a longitudinal direction such that when said joint portions are expanded a flexural operation is performed by guidance of said bone member, with said constrained layer comprising a flexible organic film material in which is knit reticulate fiber.

7. A robot arm including the laminated-type multi-joint portion drive mechanism according to claim 3.

8. A grasping hand having two members facing one another, with each of the two members including a laminated-type multi-joint portion drive mechanism according to claim 1 such that the two members can cooperate with each other to grasp an object.

9. A robot arm having at an end thereof the grasping hand according to claim 8.

10. A robot arm including the laminated-type multi-joint portion drive mechanism according to claim 1.

11. A method for manufacturing the laminated-type multi-joint portion drive mechanism according to claim 1, comprising:
    integrally molding said bone member;
    stacking said laminated-type pneumatic tube member on said bone member, and bonding said laminated-type pneumatic tube member to said bone member; and
    stacking said planar-type joint-portion flexural deformation member on said laminated-type pneumatic tube member, and bonding said planar-type joint-portion flexural deformation member to said laminated-type pneumatic tube member.

12. A robot comprising:
    a robot arm including the laminated-type multi-joint portion drive mechanism according to claim 1; and
    a grasping hand having two members facing one another, with each of the two members including a laminated-type multi-joint portion drive mechanism according to claim 1 such that the two members can cooperate with each other to grasp an object.

13. A laminated-type multi-joint portion drive mechanism comprising:
    a pneumatic drive source for providing pneumatic pressure;
    a bone member having at least two elastically-deformable elastic deformation portions;
    a laminated-type pneumatic tube member fixed on said bone member, said laminated-type pneumatic tube member having line-tubes connected to said pneumatic drive source; and
    a planar-type joint-portion flexural deformation member fixed on said laminated-type pneumatic tube member, said planar-type joint-portion flexural deformation member having joint portions and pneumatic operation chambers at said joint portions, respectively, with said joint portions being aligned with said at least two elastic deformation portions, respectively, and said pneumatic operation chambers being connected to said line-tubes, respectively,
    wherein said planar-type joint-portion flexural deformation member includes a constrained layer for imparting a directivity of expandability and contractibility to said planar-type joint-portion flexural deformation member along a longitudinal direction, such that when pneumatic pressure is applied to one of said pneumatic operation chambers a corresponding one of said joint portions is expanded so as to perform a flexural operation by guidance of said bone member.

14. The laminated-type multi-joint portion drive mechanism according to claim 13, wherein
    said at least two elastic deformation portions comprise elastic hinge portions, respectively.

15. The laminated-type multi-joint portion drive mechanism according to claim 14, wherein
    said constrained layer comprises a flexible organic film material in which is knit reticulate fiber.

16. A grasping hand having two members facing one another, with each of the two members including a laminated-type multi-joint portion drive mechanism according to claim 14 such that the two members can cooperate with each other to grasp an object.

17. The laminated-type multi-joint portion drive mechanism according to claim 13, wherein
    said constrained layer comprises a flexible organic film material in which is knit reticulate fiber.

18. A grasping hand having two members facing one another, with each of the two members including a laminated-type multi-joint portion drive mechanism according to claim 17 such that the two members can cooperate with each other to grasp an object.

19. A grasping hand having two members facing one another, with each of the two members including a laminated-type multi-joint portion drive mechanism according to claim 13 such that the two members can cooperate with each other to grasp an object.

20. A robot arm having at an end thereof the grasping hand according to claim 19.

21. A robot arm including the laminated-type multi-joint portion drive mechanism according to claim 13.

22. A laminated-type multi-joint portion drive mechanism comprising:
   a pneumatic drive source for providing pneumatic pressure;
   a bone member having at least two elastically-deformable elastic deformation portions;
   molded organic films stacked one on another so as to form a laminated-type pneumatic tube member, said laminated-type pneumatic tube member being fixed on said bone member and having line-tubes, with said line-tubes being connected to said pneumatic drive source; and
   a planar-type joint-portion flexural deformation member fixed on said laminated-type pneumatic tube member, said planar-type joint-portion flexural deformation member having joint portions and pneumatic operation chambers at said joint portions, respectively, with said joint portions being aligned with said at least two elastic deformation portions, respectively, and said pneumatic operation chambers being connected to said line-tubes, respectively,
   such that when pneumatic pressure is applied to one of said pneumatic operation chambers, a corresponding one of said joint portions is deformed.

* * * * *